(12) United States Patent
Colombo et al.

(10) Patent No.: US 12,517,272 B2
(45) Date of Patent: Jan. 6, 2026

(54) NEAR SURFACE MODELING AND DRILLING HAZARD IDENTIFICATION FOR A SUBTERRANEAN FORMATION

(71) Applicant: Saudi Arabian Oil Company, Dhahran (SA)

(72) Inventors: Daniele Colombo, Dhahran (SA); Diego Rovetta, Delft (NL); Taqi Yousuf Alyousuf, Saihat (SA); Apostolos Kontakis, Delft (SA); Ernesto Sandoval-Curiel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 456 days.

(21) Appl. No.: 18/086,294

(22) Filed: Dec. 21, 2022

(65) Prior Publication Data
US 2024/0210580 A1   Jun. 27, 2024

(51) Int. Cl.
*G01V 1/28* (2006.01)
*G01V 1/30* (2006.01)

(52) U.S. Cl.
CPC .............. *G01V 1/282* (2013.01); *G01V 1/302* (2013.01); *G01V 1/305* (2013.01)

(58) Field of Classification Search
CPC ........ G01V 1/282; G01V 1/302; G01V 1/305; G01V 2210/6222; G01V 1/303
See application file for complete search history.

(56) References Cited

U.S. PATENT DOCUMENTS

| | | |
|---|---|---|
| 6,289,285 B1 | 9/2001 | Neff et al. |
| 6,473,696 B1 | 10/2002 | Onyia et al. |
| 6,868,037 B2 | 3/2005 | Dasgupta et al. |

(Continued)

FOREIGN PATENT DOCUMENTS

| | | |
|---|---|---|
| CA | 2928955 | 5/2015 |
| WO | WO 2016193180 | 12/2016 |

(Continued)

OTHER PUBLICATIONS

Bakulin et al., "The virtual source method: Theory and case study," Geophysics, Jul.-Aug. 2006, 71(4):SI139-SI150, 12 pages.

(Continued)

*Primary Examiner* — Mi'schita' Henson
(74) *Attorney, Agent, or Firm* — Fish & Richardson P.C.

(57) ABSTRACT

Methods and devices for geophysical exploration include: acquiring seismic data representing a subterranean formation; obtaining a plurality of virtual super gathers (VSGs) comprising the seismic data by sorting the seismic data based on a hypercube with dimensions comprising common midpoint X-Y coordinates, an offset, and an azimuth, wherein one or more seismic attributes are obtained at the dimensions of the hypercube; transforming the seismic data, in the plurality of VSGs from a time-offset domain to a frequency-phase velocity domain; isolating, for VSGs of the plurality, frequencies and phase velocities of the frequency-phase velocity domain based on a windowing operation; and for frequencies isolated by the windowing operation, identifying a maximum magnitude of a phase velocity spectrum from the plurality of VSGs.

20 Claims, 13 Drawing Sheets

(56) References Cited

U.S. PATENT DOCUMENTS

| | | | |
|---|---|---|---|
| 6,982,928 | B2 | 1/2006 | Al-Ali |
| 7,157,914 | B2 | 1/2007 | Morrison et al. |
| 7,948,237 | B2 | 5/2011 | Kuzmin et al. |
| 8,386,218 | B2 | 2/2013 | Shin |
| 8,509,027 | B2 | 8/2013 | Strobbia et al. |
| 8,861,308 | B2 | 10/2014 | Virgillio et al. |
| 10,067,255 | B2 | 9/2018 | Colombo et al. |
| 10,386,519 | B2 | 8/2019 | Colombo et al. |
| 10,852,450 | B2 | 12/2020 | Colombo et al. |
| 10,920,585 | B2 | 2/2021 | Colombo et al. |
| 11,768,303 | B2 | 9/2023 | Colombo et al. |
| 11,906,694 | B2 | 2/2024 | AlJanobi |
| 2008/0015780 | A1 | 1/2008 | Dimri et al. |
| 2009/0306900 | A1 | 12/2009 | Jing et al. |
| 2010/0018719 | A1 | 1/2010 | Lu et al. |
| 2011/0060563 | A1 | 3/2011 | Guenther et al. |
| 2011/0317520 | A1 | 12/2011 | Alkhalifah et al. |
| 2012/0113751 | A1 | 5/2012 | Goertz |
| 2014/0277752 | A1 | 9/2014 | Chang et al. |
| 2016/0077228 | A1 | 3/2016 | Hokstad |
| 2016/0084008 | A1 | 3/2016 | Faircloth et al. |
| 2016/0178782 | A1 | 6/2016 | Miles |
| 2016/0187513 | A1 | 6/2016 | Poole et al. |
| 2017/0010387 | A1 | 1/2017 | Huang |
| 2017/0068008 | A1 | 3/2017 | Colombo et al. |
| 2017/0153344 | A1 | 6/2017 | Lafet et al. |
| 2017/0176617 | A1 | 6/2017 | Colombo et al. |
| 2018/0203151 | A1 | 7/2018 | Kouchmeshky et al. |
| 2018/0321405 | A1 | 11/2018 | Colombo et al. |
| 2018/0335530 | A1 | 11/2018 | Wu et al. |
| 2018/0372897 | A1 | 12/2018 | Colombo et al. |
| 2021/0181363 | A1 | 6/2021 | Alyousuf et al. |
| 2021/0190983 | A1 | 6/2021 | Colombo et al. |
| 2021/0264262 | A1 | 8/2021 | Colombo et al. |
| 2022/0187492 | A1 | 6/2022 | Colombo et al. |
| 2022/0342101 | A1* | 10/2022 | Colombo .............. G01V 1/303 |
| 2023/0125277 | A1 | 4/2023 | Colombo et al. |
| 2025/0216566 | A1* | 7/2025 | Colombo .............. G01V 1/282 |

FOREIGN PATENT DOCUMENTS

| | | |
|---|---|---|
| WO | WO 2017106127 | 6/2017 |
| WO | WO 2020089670 | 5/2020 |

OTHER PUBLICATIONS

Colombo et al., "Fully automated near-surface analysis by surface-consistent refraction method," Geophysics, 81(4): U39-U49, Jul.-Aug. 2016, 11 pages.

Frisk et al., "Shallow water waveguide characterization using the Hankel transform," The Journal of the Acoustical Society of America, Mar. 14, 1984, 76(1):205-216, 12 pages.

Hisada, "An efficient method for computing Green's functions for a layered half-space with sources and receivers at close depths," Bulletin of the Seismological Society of America, Oct. 1994, 84(5):1456-1472, 17 pages.

Lai et al., "Simultaneous inversion of Rayleigh phase velocity and attenuation for near-surface site characterization," Georgia Institute of Technology, School of Civil and Environmental Engineering, Jul. 1998, 275 pages.

Lian et al., "An Innovative Spark Based Surface Consistent Residual Static Correction Method," 81st EAGE Conference & Exhibition, Jun. 3-6, 2019, 6 pages.

Lu et al., "3D Super-virtual Refraction Interferometry," Geophysics, Jan. 15, 2020, 85(3):1-44, 44 pages.

Pratt, "Seismic waveform inversion in the frequency domain, Part 1: Theory and verification in a physical scale model," Geophysics, May-Jun. 1999, 64(3):888-901, 14 pages.

Sedova et al., "Acoustic Land Full Waveform Inversion on a Broadband Land Dataset: the Impact of Optimal Transport." 81st EAGE Conference and Exhibition, Jun. 3-6, 2019, 5 pages.

Shin et al., "Waveform inversion in the Laplace-Fourier domain," Geophysical Journal International, 177(3), 2009, 1067-1079, 13 pages.

Strobbia et al., "Surface waves: processing, inversion and removal," Near Surface Geoscience, Aug. 2010, 28:85-91, 7 pages.

Tarantola, "Inversion of seismic reflection data in the acoustic approximation," Geophysics, Aug. 1984, 49(8):1259-1266, 8 pages.

Al-Ali et al., "Vibrator Attribute Leading Velocity Estimation," The Leading Edge, May 1, 2003, 22(3):400-405, 5 pages.

Carvill, "Integration of an extensive uphole program with refraction analysis to build a 3-D near-surface model on a workstation: A case history," SEG Technical Program Expanded Abstracts, 1995, pp. 127-130, 4 pages.

Colombo et al., "High-Resolution velocity modeling by seismic-airborne TEM joint inversion: A new perspective for near-surface characterization," The Leading Edge, Nov. 2016, 35(11):936-944, 9 pages.

Colombo et al., "Near-Surface P-Velocity modelling by integrated seismic, EM, and Gravity Data: Examples from the Middle East," First Break, Oct. 2008, 26(10):91-102, 12 pages.

Colombo et al., "Seismic-airborne TEM Joint Inversion and Surface Consistent Refraction Analysis: New Technologies for Complex Near Surface Corrections," For Society of Petroleum Engineers, SPE-184029-IVIS, presented at the SPE Middle East Oil & Gas Show and Conference, Manama, Kingdom of Bahrain, Mar. 6-9, 2017, pp. 1-15, 15 pages.

Colombo et al., "Seismic-airborne TEM joint inversion for near-surface velocity modeling in complex wadi," SEG Technical Program Expanded Abstracts, Oct. 2016, pp. 1-4, 4 pages.

Goodfellow et al., "Generative Adversarial Nets," CoRR, Submitted on Jun. 10, 2014, arXiv:1406.2661v1, pp. 1-9, 9 pages.

Marquis et al., "3D near-surface velocity model building by joint seismic-airborne EM inversion," SEG Technical Program Expanded Abstracts, Presented at SEG International Exposition and 87th Annual Meeting, Oct. 19, 2016, pp. 922-926, 5 pages.

Vesnaver et al., "Geostatistical integration of near-surface geophysical data," Geophysical Prospecting, Nov. 2006, 54(6):763-777, 15 pages.

SAIP Examination Report in SAIP Appln. No. 123451077, mailed on Nov. 13, 2024, 15 pages (with English Translation).

SAIP Examination Report in SAIP Appln. No. 123451077, mailed on Nov. Jun. 23, 2025, 12 pages (with English Translation).

Seydoux et al., "Clustering earthquake signals and background noises in continuous seismic data with unsupervised deep learning," Nature Communications, Aug. 7, 2020, 12 pages.

* cited by examiner

NEAR SURFACE MODELING AND DRILLING HAZARD IDENTIFICATION FOR A SUBTERRANEAN FORMATION

TECHNICAL FIELD

The present disclosure relates to geophysical exploration.

BACKGROUND

Estimation of shallow rock integrity is relevant to the identification and mapping of shallow drilling hazards that present challenges to drilling operations. Certain rock formations are subject to erosion and dissolution and remain in a critical state of mechanical integrity until some external factor intervenes. In the case of shallow drilling hazards, the state in critical equilibrium is often represented by karsting activity caused by dissolution through percolating water. When the precarious equilibrium conditions are perturbed by a load increase (e.g., a well rig), or by the increase of pore pressure due to circulation of drilling fluids, the rock mass can suddenly collapse with catastrophic consequences for infrastructures and personnel. Prevention of sudden collapses linked to drilling operations has become a major objective in areas where such incidents are recurrent.

Poisson's ratio $\sigma$ is an elastic parameter representing the ratio of transverse contractional strain to longitudinal extensional strain. It can be associated with the integrity of the materials from an engineering perspective. The Poisson's ratio $\sigma$ of the near surface materials is a key parameter for a geotechnical evaluation of soils and shallow rocks.

SUMMARY

This specification describes an approach to geophysical exploration of subterranean formations including the acquisition, data processing and inversion of combined compressional P-waves and shearing surface waves (SW) to generate P-velocity ($V_p$), S-velocity ($V_s$) and Poisson's ratio ($\sigma$) distributions in a 3D volume. These distributions can be used as diagnostic tools for the evaluation of the shallow rock integrity before the start of drilling activities. The derived parameters can also be used for other near surface characterization operations, such as calculation of velocity models for seismic processing corrections. The approach involves the automation and the enhancement of certain human-intensive interpretation steps using machine learning, as well as implementation of regularization and joint inversion techniques based on unsupervised machine learning methods.

In one aspect, methods for geophysical exploration include: acquiring seismic data representing a subterranean formation; obtaining a plurality of virtual super gathers (VSGs) comprising the seismic data by sorting the seismic data based on a hypercube with dimensions comprising common midpoint X-Y coordinates, an offset, and an azimuth, wherein one or more seismic attributes are obtained at the dimensions of the hypercube; transforming the seismic data, in the plurality of VSGs from a time-offset domain to a frequency-phase velocity domain; isolating, for VSGs of the plurality, frequencies and phase velocities of the frequency-phase velocity domain based on a windowing operation; and for frequencies isolated by the windowing operation, identifying a maximum magnitude of a phase velocity spectrum from the plurality of VSGs.

In one aspect, one or more non-transitory machine-readable storage devices storing instructions for geophysical exploration, the instructions being executable by one or more processing devices to cause performance of operations including: obtaining a plurality of virtual super gathers (VSGs) comprising seismic data by sorting the seismic data based on a hypercube with dimensions comprising common midpoint X-Y coordinates, an offset, and an azimuth, wherein one or more seismic attributes are obtained at the dimensions of the hypercube; transforming the seismic data, in the plurality of VSGs from a time-offset domain to a frequency-phase velocity domain; isolating, for VSGs of the plurality, frequencies and phase velocities of the frequency-phase velocity domain based on a windowing operation; and for frequencies isolated by the windowing operation, identifying a maximum magnitude of a phase velocity spectrum from the plurality of VSGs.

Embodiments of these methods and devices can include one or more of the following features.

In some embodiments, clustering maxima identified from the plurality of VSGs by a density based spatial clustering of applications with noise (DBSCAN) operation. In some cases, these aspects further include defining a plurality of surface wave dispersion curves for each identified cluster by defining a surface corresponding to a surface-wave propagation mode for each cluster identified. In some cases, further include iteratively performing the clustering of the maxima and the defining of the plurality of surface wave dispersion curves.

In some cases, these aspects further include obtaining a pseudo three-dimensional (3D) surface wave velocity distribution by forward modeling the plurality of surface wave dispersion curves and inverting the plurality of forward modeled surface wave dispersion curves. In some cases, these aspects further include obtaining a 3D P velocity distribution based on automatically picking a transmitted wavefield first break travel time for the VSGs of the plurality; generating a forward modeled one and a half dimension (1.5D) travel time full waveform for VSGs of the plurality and inverting the forward modeled 1.5D travel time full waveform for the VSGs of the plurality.

In some cases, these aspects further include forward modeling the plurality of surface wave dispersion curves; picking a transmitted wavefield first break travel time for the VSGs of the plurality; generating a forward modeled 1.5D travel time full waveform for the VSGs of the plurality; and performing a joint 1.5D travel-time full waveform surface wave inversion comprising a structure operator, a rock-physics operator, and a clustering operator to obtain a pseudo three-dimensional 3D S velocity distribution and a three-dimensional (3D) P velocity distribution.

In some cases, these aspects further include computing a 3D distribution of Poisson's ratio of the subterranean formation based on the 3D P velocity distribution and the pseudo 3D surface wave velocity distribution.

In some cases, these aspects further include drilling a well in the subterranean formation based on the 3D distribution of Poisson's ratio.

Certain implementations of this approach may have particular advantages. In some implementations near surface properties and shallow drilling hazards are directly mapped with benefits in the areas of automation (e.g., most of the steps are data-driven with minor or no human intervention), reliability (e.g., the use of multiple data sensible to different elastic parameters and the combined Poisson's ratio), and robustness (e.g., the implementation of robust and unsupervised machine learning techniques for data analysis and joint inversion). In another instance, the signal-to-noise (s/n) ratio is enhanced by using virtual super gathers (VSG). In other implementations, this method is mostly unsupervised, automatic and data driven with the identification of key aspects in the s/n enhancement via VSG generation and automatic picking of dispersion curves using unsupervised machine learning techniques such as DBSCAN. Some implementations of this approach use joint inversion techniques using full waveform inversion and special rock-physics coupling operators such as provided by unsupervised machine learning techniques, for example, Fuzzy C-means clustering.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This specification describes an approach to geophysical exploration of subterranean formations including the acquisition, data processing and inversion of combined compressional P-waves and shearing surface waves (SW) to generate P-velocity ($V_p$), S-velocity ($V_s$) and Poisson's ratio ($\sigma$) distributions in a 3D volume. These distributions can be used as diagnostic tools for the evaluation of the shallow rock integrity before the start of drilling activities. The derived parameters can also be used for other near surface characterization operations, such as calculation of velocity models for seismic processing corrections. The approach involves the automation and the enhancement of certain human-intensive interpretation steps using machine learning, as well as implementation of regularization and joint inversion techniques based on unsupervised machine learning methods.

Figure 1:
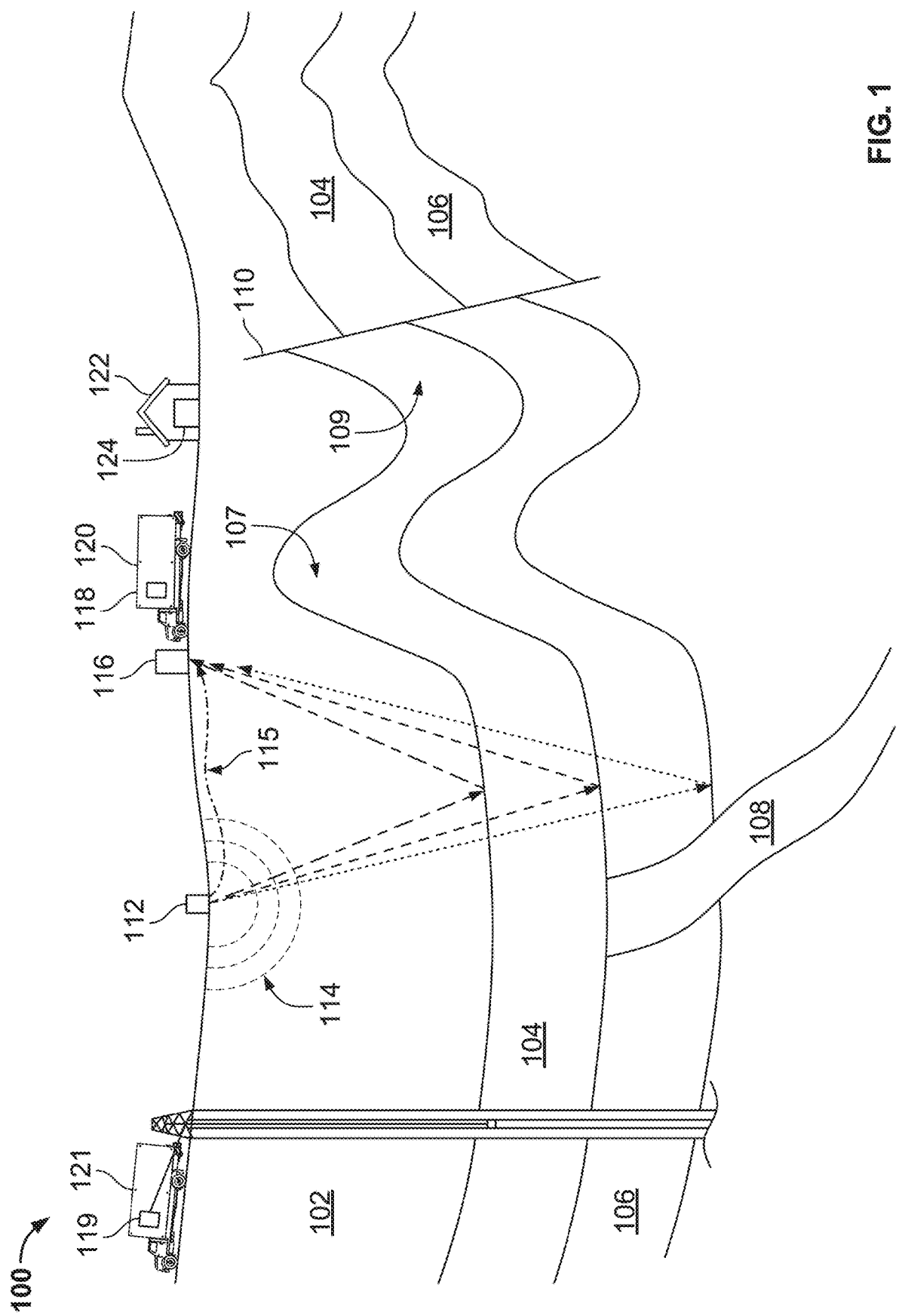
FIG. 1 is a schematic view of a seismic survey being performed to map subterranean features such as facies and faults.

FIG. 1 is a schematic view of a seismic survey being performed to map subterranean features such as facies and faults in a subterranean formation 100. Data collected from a seismic survey can be used to model the near surface area of the subterranean formation and identify potential drilling hazards. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

A seismic source 112 (for example, a seismic vibrator or an explosion) generates seismic waves 114 that propagate in the earth. The velocity of these seismic waves depends on properties such as, for example, density, porosity, and fluid content of the medium through which the seismic waves are traveling. Different geological bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor, or sensors, 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

A control center 122 can be operatively coupled to the seismic control truck 120 and other data acquisition and wellsite systems. The control center 122 may have computer facilities for receiving, storing, processing, and/or analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

The Poisson's ratio can be estimated by analysis of P and S velocities ($V_p$ and $V_s$, respectively) as derived by seismic surveys where the compressional/pressure waves are analyzed together with the surface waves (SW) to generate $V_p$ and $V_s$ models. Seismic acquisition can be performed in 2D and 3D with several different source types and variable parameterization of the source signal. Typical sources can include a sledge-hammer, weight drop, minivib, etc. for geotechnical/shallow surveys or explosive, vibroseis, airguns, marine vibrators, etc. for larger scale and deeper penetration seismic surveys. Techniques for interpretation of the survey and the characteristics of the elastic wave propagation do not change at these scales. Based on these considerations, the methodologies of the present disclosure can be applicable to a wide range of scales, for example, high resolution drill pad investigation for drilling hazards, or the exploration of vast areas on land or in shallow water. Seismic data are typically recorded along linear arrays of receivers (e.g., geophones) with sources arranged in line with the receivers for 2D land configurations or otherwise crossline for 3D land configurations. Marine acquisitions have specific acquisition geometries for ocean bottom node (OBN) and ocean bottom cable (OBC) techniques. Completely random locations of sources and receivers are also possible on land and marine acquisition configurations.

Figure 2:
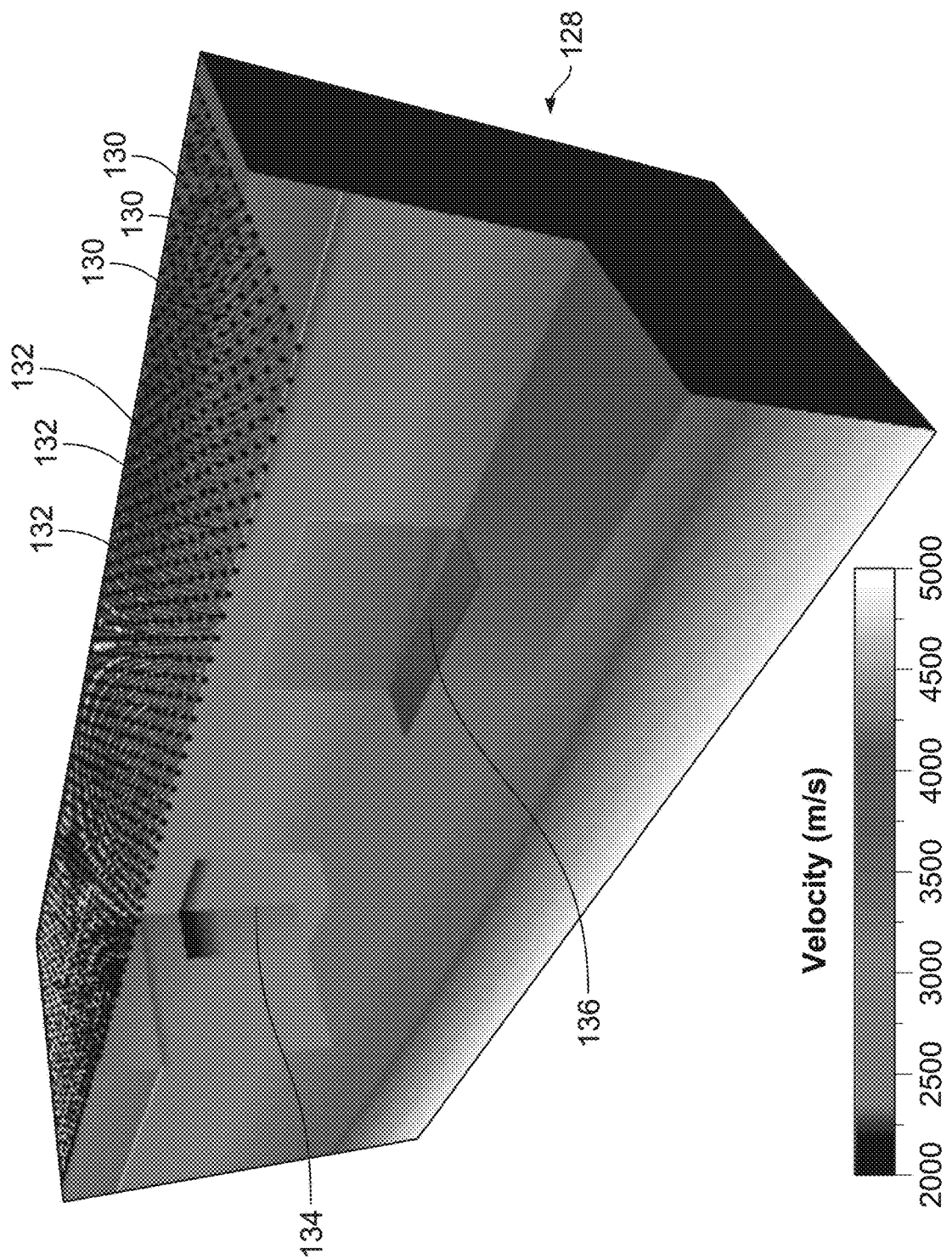
FIG. 2 is a schematic of a full 3D seismic survey.

FIG. 2 shows an example schematic of a full three-dimensional (3D) seismic survey of a subterranean formation 128. A dense layout of seismic receivers 130 (small dots) measure the wavefield generated by a dense array of sources 132 (bold dots). Two shallow anomalies 134, 136 are shown near the surface of the subterranean formation 128 representing potential shallow drilling hazards. The approach of the present disclosure can be used with seismic surveys from a variety of configurations, for example, a dense 2D configuration or a full 3D configuration where a multitude of different 3D seismic acquisition schemes could be used to acquire the seismic data.

The recorded seismic data are typically analyzed by performing a transformation from a time-offset domain to a frequency-phase velocity domain where the corresponding dispersion curves are picked and the resulting phase velocity versus frequency data are inverted in 1D for the shear velocity ($V_s$). The interpretation of the corresponding compressional/pressure velocity ($V_p$) can be done, for example, by using nearby shallow vertical borehole surveys (e.g., uphole surveys), which provide the vertical travel times for interpreting the corresponding P velocity, or by inverting the refraction first break (FB) travel time data from a seismic survey. The interpretation of SW dispersion curves and FB travel times for P and S velocity estimation directly from the seismic records can be compromised when the data shows low signal-to-noise ratio. The operations involved in industry-standard methods can be very human-intensive involving the manual interpretation (e.g., picking) of SW dispersion curves and of refracted arrival (e.g., first break) times. Human-intensive manual interpretation is also subjective, and the results are heavily dependent on the abilities of the geophysical processor involved. Results are obtained as 2D cross-sections of the subterranean formation or 3D volumes from the combination of several local 1D inversions.

Figure 3A:
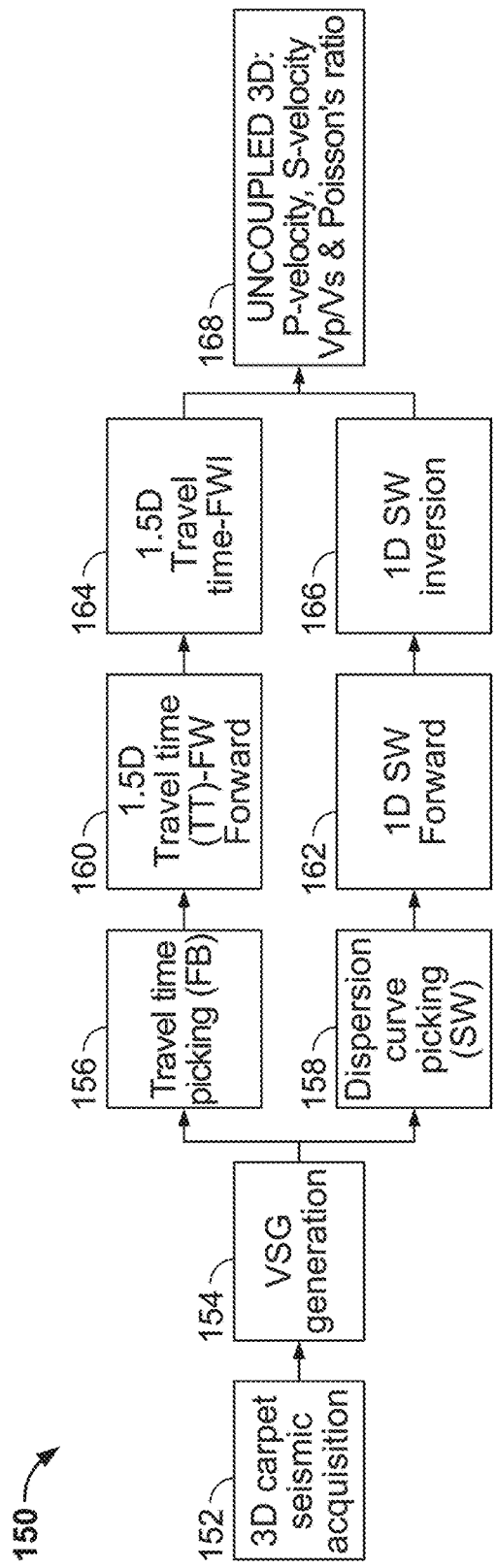
FIGS. 3A-3B show example flow charts of a method of geophysical exploration.
Figure 3B:
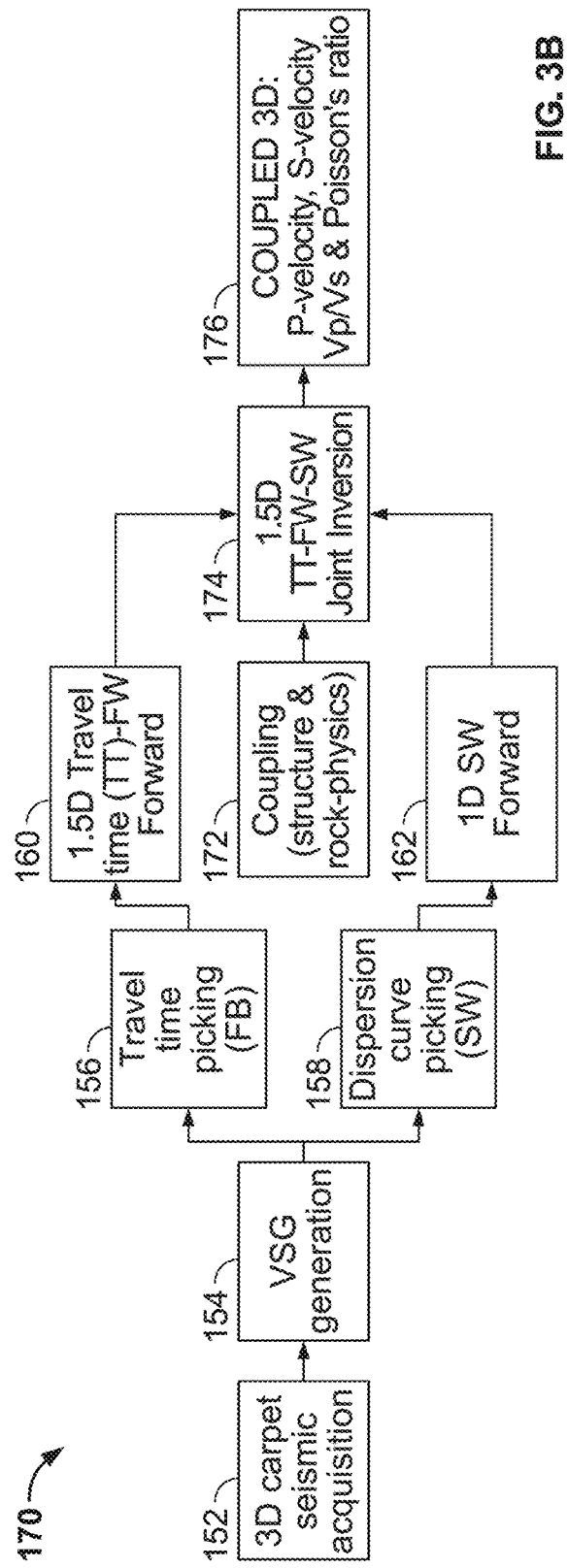

FIGS. 3A-3B shows flow charts of two example methods that can be used in the derivation of a 3D distribution of Poisson's ratio. The first example method 150 in FIG. 3A includes a 3D carpet acquisition of seismic data (step 152) such as is shown in FIG. 2, the generation of enhanced s/n virtual super gathers (step 154), picking of travel times (step 156) and dispersion curves (step 158), forward modeling of 1.5D travel-time-full waveform (step 160) and forward modeling of SW dispersion curves (step 162), and separated (e.g., uncoupled) 1.5D travel time-full waveform inversion (TT-FWI) (step 164) and SW inversions (step 166). This method 150 generates 3D volumes of P and S velocities that can be combined to derive the $V_p/V_s$ and Poisson's ratio distribution (step 168). Such a procedure takes advantage of the described s/n enhancement via VSG generation, unsupervised clustering techniques for picking, TT-FWI, and 1D SW inversion.

FIG. 3B shows a flow chart for the second example method 170, which further enhances the results of the first example method 150 by introducing coupling mechanisms (step 172) into a joint inversion of the 1.5D TT-FW-SW (step 174) to obtain coupled 3D $V_p$, $V_s$, $V_p/V_s$ and Poisson's ratio distributions (step 176). More details of the steps for each example procedure are given in the subsequent paragraphs.

At step 154, VSG signal-to-noise (s/n) enhancement is obtained by the generation of virtual super gathers (VSGs) through a process of sorting the seismic data in a hypercube comprising X-Y common midpoint (CMP) spatial coordinates, offset, azimuth, and seismic attributes (e.g., travel times and/or seismic traces). VSGs provide a volumetric estimate of the seismic wavefield, thus accounting for 3D propagation of the seismic waves.

Figure 4:
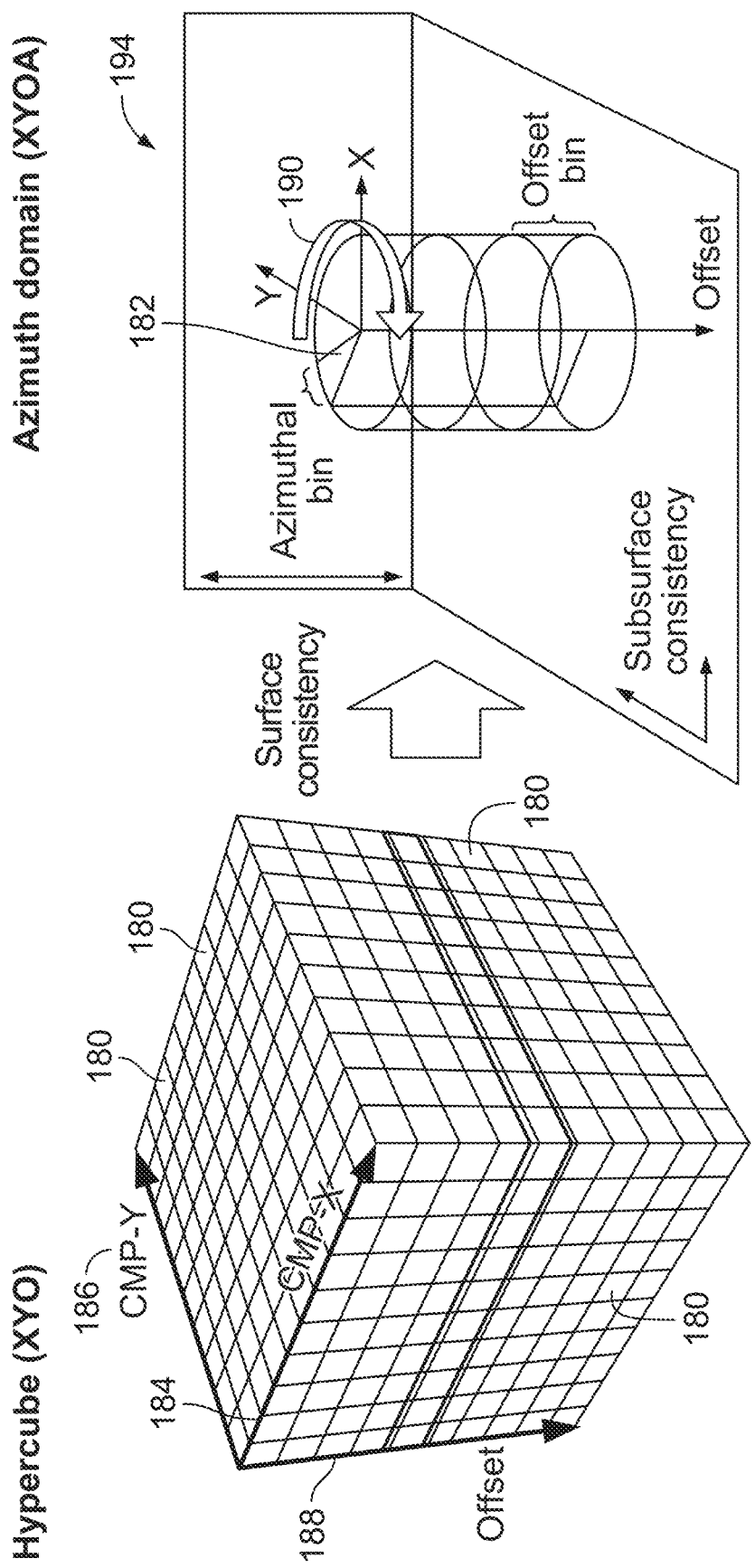
FIG. 4 shows a schematic of a hypercube domain and an azimuth domain.

FIG. 4 illustrates seismic trace sorting into CMP-offset bins 180. The multi dimensional attribute cubes or bins are used for quality control since these cubes or bins 180 enable a visualization of the spatial trends of the travel time (mean values) and the noisy areas (standard deviation). The seismic traces can be further sorted into an azimuthal bin 182 that can include surface wave dependencies on polarization or anisotropy and s/n. When performing the 4D CMP-offset-azimuth binning (that is, XYOA binning in the directions of CMP-X 184, CMP-Y 186, offset 188, and azimuth 190), the bin sizes in the CMP-X 184 and CMP-Y 186 directions can be kept greater, such that a sufficient number of CMPs are placed in a bin 182 to provide functionally applicable statistics. Azimuthal bin sizes can be for example 45 degrees or 90 degrees depending on the 3D seismic acquisition parameters such as full azimuth or narrow azimuth. The XYOA binning illustrated in FIG. 4 is different from sorting in a common offset domain as the latter collects data sharing a common offset but pertaining to different CMPs. The existing CMP sorting (time-offset) that is applied for reflected waves is less useful for refracted waves as it would display events with variable velocities over the offset axis. The XYOA binning method is therefore an effective representation of both CMP and offset domains where common properties at a CMP position can be assessed.

In some implementations, as shown in FIG. 4, the XYOA space 194 is divided into XYOA bins 182 of a particular size. For example, each bin 182 can have a size of 100 meters (m) in the CMP-X direction, 100 m in the CMP-Y direction, 50 m in the offset direction, and an azimuth bin of 45 deg. For each trace (or first break pick), the offset (the distance between the source and the receiver), the CMP (the middle point position between the source and the receiver), and the azimuth are determined, and the trace is sorted into a particular bin based on the offset, the CMP, and the azimuth. Each XYOA bin 182 includes a collection of traces sharing a common (or similar) midpoint position, a common (or similar) offset, and a common (or similar) azimuth. The collection of traces in an XYOA bin is sometimes referred to as an XYOA gather.

Signal-to-noise enhancement is obtained by the generation of virtual super gathers (VSG). This is obtained through a process of sorting seismic data in a 4D hypercube consisting of X-Y midpoint spatial coordinates, offset and azimuth, where seismic attributes (travel times and/or seismic traces) are collected as shown in FIG. 4. VSGs provide a volumetric estimate of the seismic wavefield propagation, hence accounting for 3D propagation. The process for generating VSGs or enhanced VSGs (eVSGs) is described by U.S. patent application Ser. No. 17/237,746, filed on Apr. 22, 2021 (Colombo et al.), which is hereby incorporated by reference in its entirety. The preparation scheme of the eVSGs remain largely the same as in Colombo et al. with the difference of the addition of an azimuth dimension for SW analysis that, depending on the cases, may enhance the stacking properties of the eVSGs by analyzing the azimuthal dependence of polarization or anisotropy and s/n for the SW. The sorting domain of the present disclosure is XYOA (XY of the source-receiver midpoint, offset, azimuth) instead of XYO as used by Colombo et al. Further, the SW in Colombo et al. are removed by muting while in the present disclosure the SW are not muted and are utilized for dispersion curve analysis.

Figure 5B:
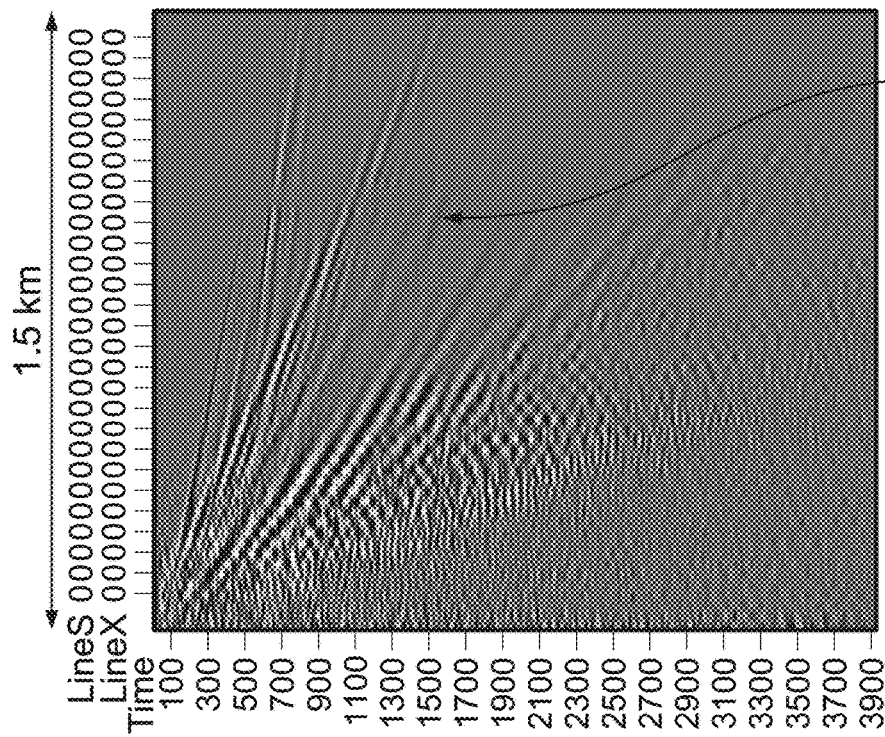
FIGS. 5A-5B shows an example single fold shot gather and an example virtual super gather.
Figure 5A:
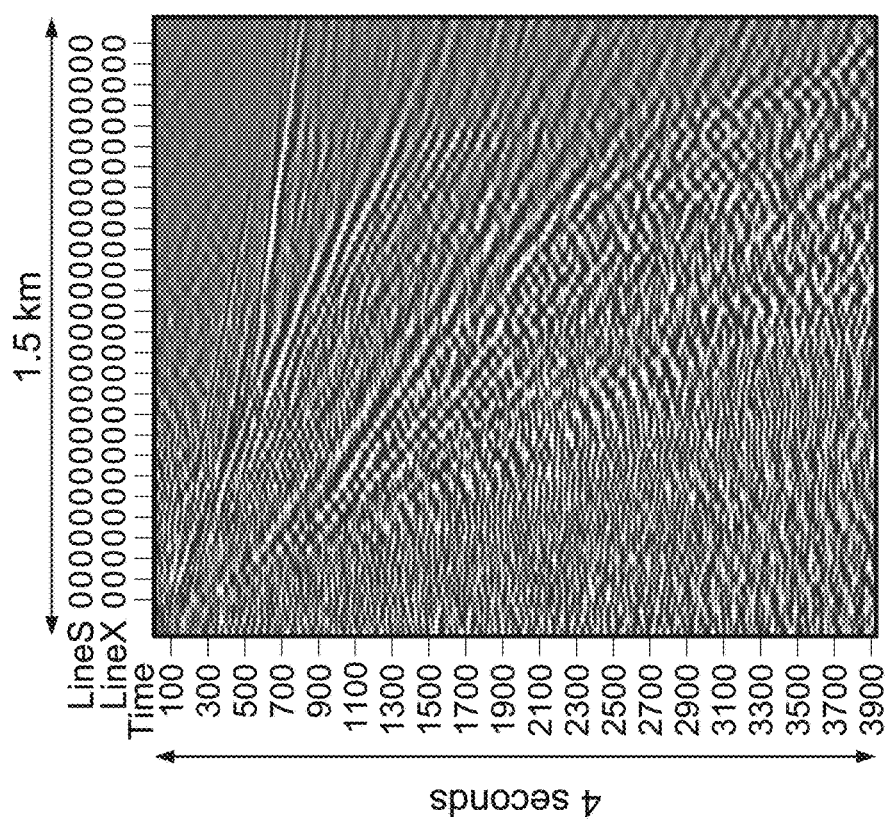

FIG. 5A and FIG. 5B show the effects of VSG generation on the SW. FIG. 5A displays an example wavefield 500 from a single fold shot gather. FIG. 5B shows an example wavefield 502 from a VSG. The s/n ratio for the whole seismic wavefield 502 has increased including the SW component 504, in comparison with the wavefield 500 from a single fold shot gather.

In seismic exploration, seismic surface waves in shot gathers are transformed from a time-offset domain to a frequency-phase velocity domain to pick dispersion curves (step 158) for a fundamental mode and higher modes. The analysis of surface waves is not always possible due to inadequate sampling of the fundamental and higher modes in the frequency domain and due to coherent and random noise. In the approach of the present disclosure, the sorting domain of enhanced VSGs (eVSGs) are used in which seismic traces, including surface waves, are sorted using CMP location, offset and azimuth (XYOA). This approach can enhance the fundamental mode and higher modes to remove the effects of spatial aliasing and random noise.

The seismic data traces of the single fold gather 500 and of the VSG 502 are transformed from a time offset (t,x) domain to a frequency, wavenumber (f,k) domain using a 2D Fourier transformation:

$$U(f, k) = \frac{1}{2\pi} \int_{-\infty}^{\infty} \int_{-\infty}^{\infty} u(x, t) \exp^{-i2\pi(ft-kx)} dx dt, \quad (1)$$

which is transformed further to phase velocity spectrum using:

$$v = f/k. \quad (2)$$

This transform is used in seismic exploration to separate seismic events characterized by different frequencies and wavenumbers.

Figure 6:
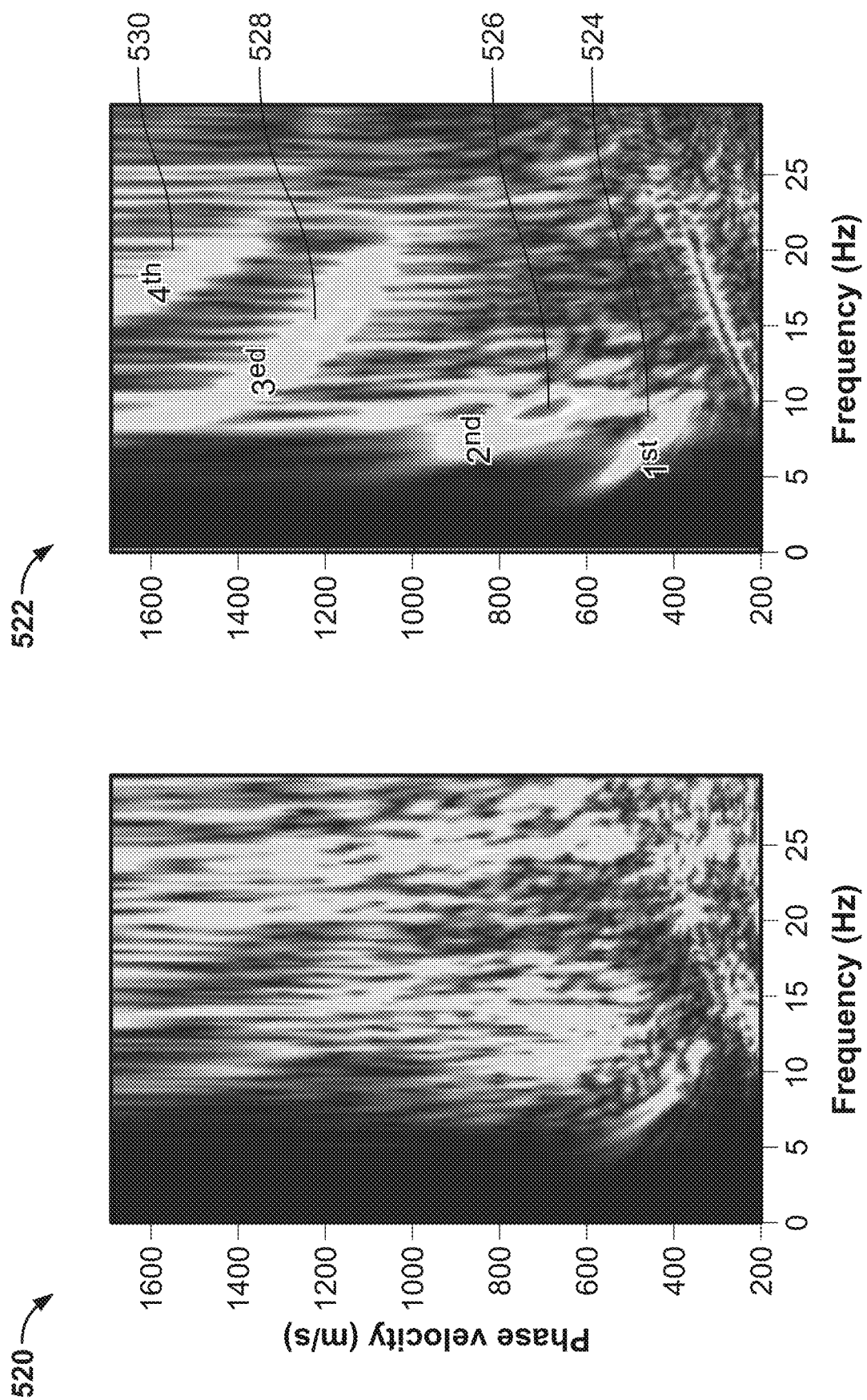
FIG. 6 shows example frequency-phase velocity spectra from a single fold shot gather and a virtual super gather.

FIG. 6 shows an example phase velocity spectrum using the shot sorting domain 520 and an example phase velocity spectrum using the CMP-offset-azimuth (XYOA) sorting domain 522 after VSG transformation. The phase velocity spectrum using shot domain data 520 is very noisy, and it is difficult to pick relevant features. The phase velocity spectrum using the XYOA sorting domain 522 shows improvement after the VSG generation. The fundamental mode 524 and the higher modes 526, 528, 530 of the dispersion curves become clearly visible. The enhanced XYOA sorting domain 522 is where unsupervised machine learning techniques can be effectively employed for automatic picking of dispersion curves.

Clustering algorithms can handle the problem of identifying surface wave propagation modes in the frequency-phase velocity spectrum. When applied to big datasets, these algorithms need to be able to discover clusters of arbitrary shape with good efficiency and should have a low number of input parameters. Spectral clustering techniques typically satisfy these requirements showing superior results when compared with other standard clustering techniques like k-means.

Density-based spatial clustering of applications with noise (DBSCAN) is designed to deal with arbitrary shaped clusters. It is highly efficient on large datasets, and it requires only one input parameter, which is automatically derived. These properties, together with full automation and robustness in the presence of noise (due to its density-based clustering approach), make this algorithm a suitable candidate for picking dispersion curves. It works by assuming that within each cluster there is a typical density of points, which is considerably higher than outside of the cluster, and the density within the areas of noise is lower than the density in any of the clusters.

Figure 7A:
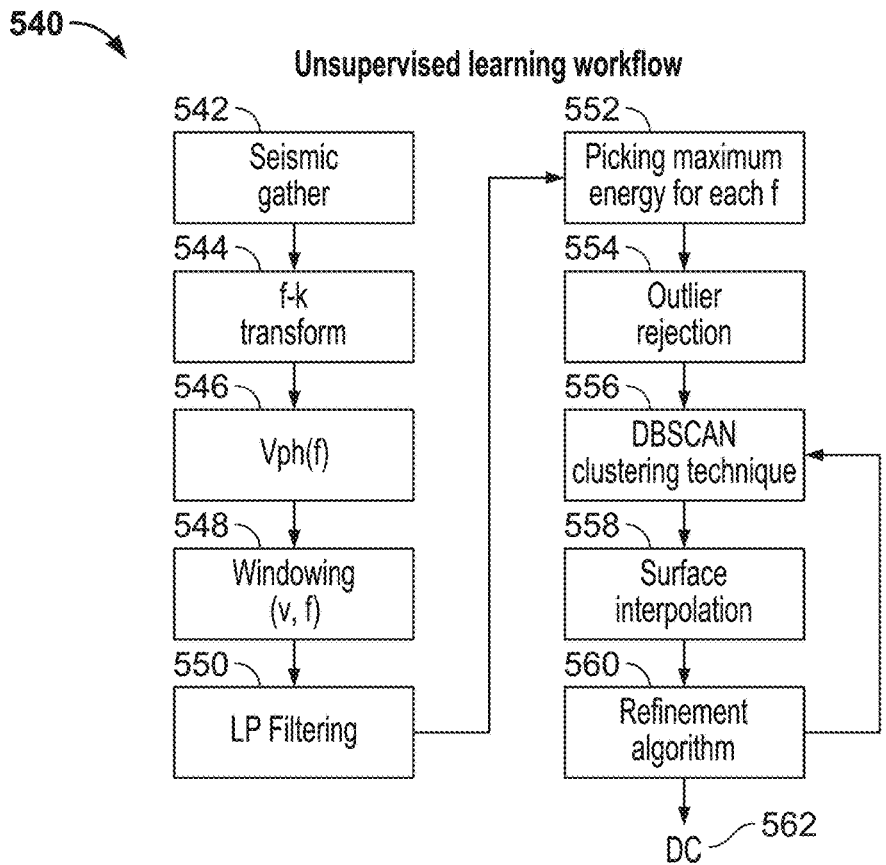
FIGS. 7A-7B show an example workflow for picking dispersion curves.

FIG. 7A shows an example workflow 540 for picking dispersion curves based on DBSCAN. Seismic data is gathered using, for example, a plurality of VSGs (step 542). The plurality of seismic gathers is then transformed from the time-offset domain into the frequency-wavenumber domain by applying a 2D Fourier transform to each gather separately (step 544). The plurality of seismic gathers is further transformed into phase velocity spectra (step 546). Windowing is applied to the phase velocity spectra of the plurality of seismic gathers to isolate specific frequencies and phase velocities (step 548). For example, 300 m/s and 1000 m/s can be used as minimum and maximum phase velocities, respectively, and 3 Hz to 15 Hz as minimum and maximum frequencies. The spectra can be filtered by a low-pass filter to remove high frequency noise (step 550). For example, a Butterworth low-pass filter of the third order and a normalized cut-off frequency of 0.1 can be used. For each frequency, the maximum magnitude of the phase velocity spectrum is picked for each seismic gather (step 552) For each gather, within the selected frequency/phase velocity window, one maximum of the frequency-phase velocity spectrum is picked per frequency across all phase velocities, meaning that for each frequency only one phase velocity is picked, followed by application of a simple outlier rejection algorithm (step 554). One example of a simple outlier rejection algorithm is removing the outliers that act as spikes in the frequency-phase velocity curves based on the calculation of the gradient of the curves and eliminating the values corresponding to a gradient bigger than a threshold specified by the user (for example, 500 m/s). Many other criteria based on statistics (for example, the mean and standard deviation of the frequency-phase velocity curves) can also be used. The set of maxima picked for all frequencies (or a predetermined subset of frequencies) and all seismic gathers (or a predetermined subset of gathers) analyzed defines a 3D point cloud with dimensions of phase velocity, frequency, and gather number. DBSCAN is then applied to the cloud of 3D points (step 556). Each of the clusters discovered by DBSCAN represents points belonging to a surface corresponding to a surface-wave propagation mode. Some points may be missing for some particular frequencies or gathers. A 3D linear interpolation is applied to fill any gaps in frequencies (step 558). The resultant surfaces can be refined by iteratively applying the DBSCAN technique (step 556) and the 3D linear interpolation (step 558) where the output of the linear interpolation becomes the input to the DBSCAN technique on the subsequent iteration (step 560). After one or more iterations, dispersion curves can be extracted from the identified surfaces at desired frequencies for each gather.

Figure 7B:
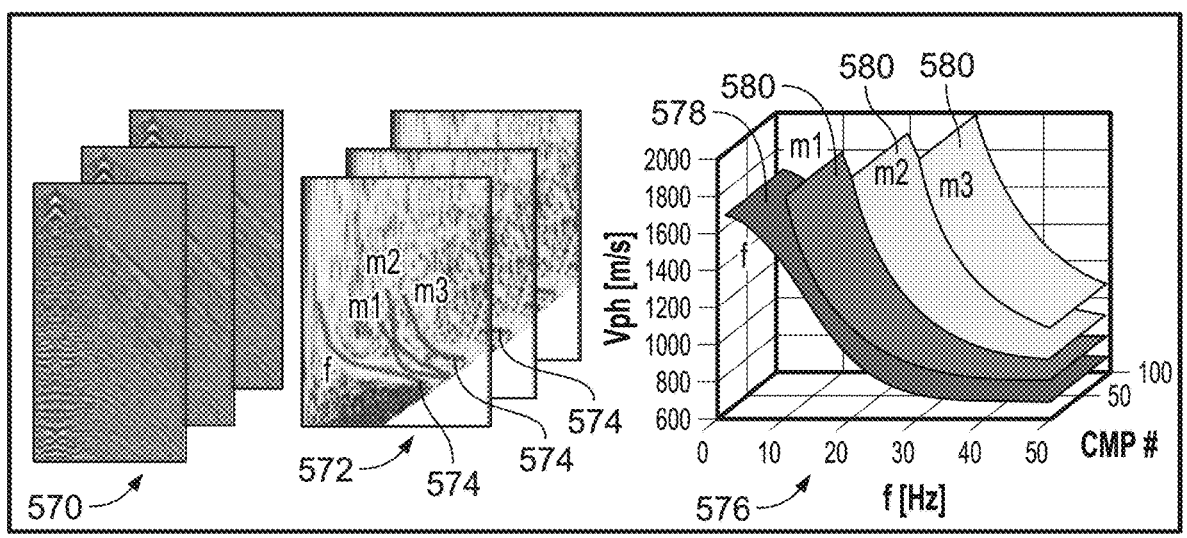

FIG. 7B shows example graphical representations of the example workflow 540. Seismic data is gathered using a plurality of virtual shot gathers 570 (step 542). The plurality of VSGs is transformed from the time-offset domain into the frequency-phase velocity domain 572 (steps 544 and 546). Maxima 574 in the phase velocity spectra for each VSG are picked (steps 548, 550, 552, 554). The picked maxima define a 3D point cloud. Through application of the DBSCAN technique, interpolation, and refinement (steps 556, 558 and 560) surfaces 576 corresponding to the fundamental mode 578 and higher modes 580 are defined.

Figure 8:
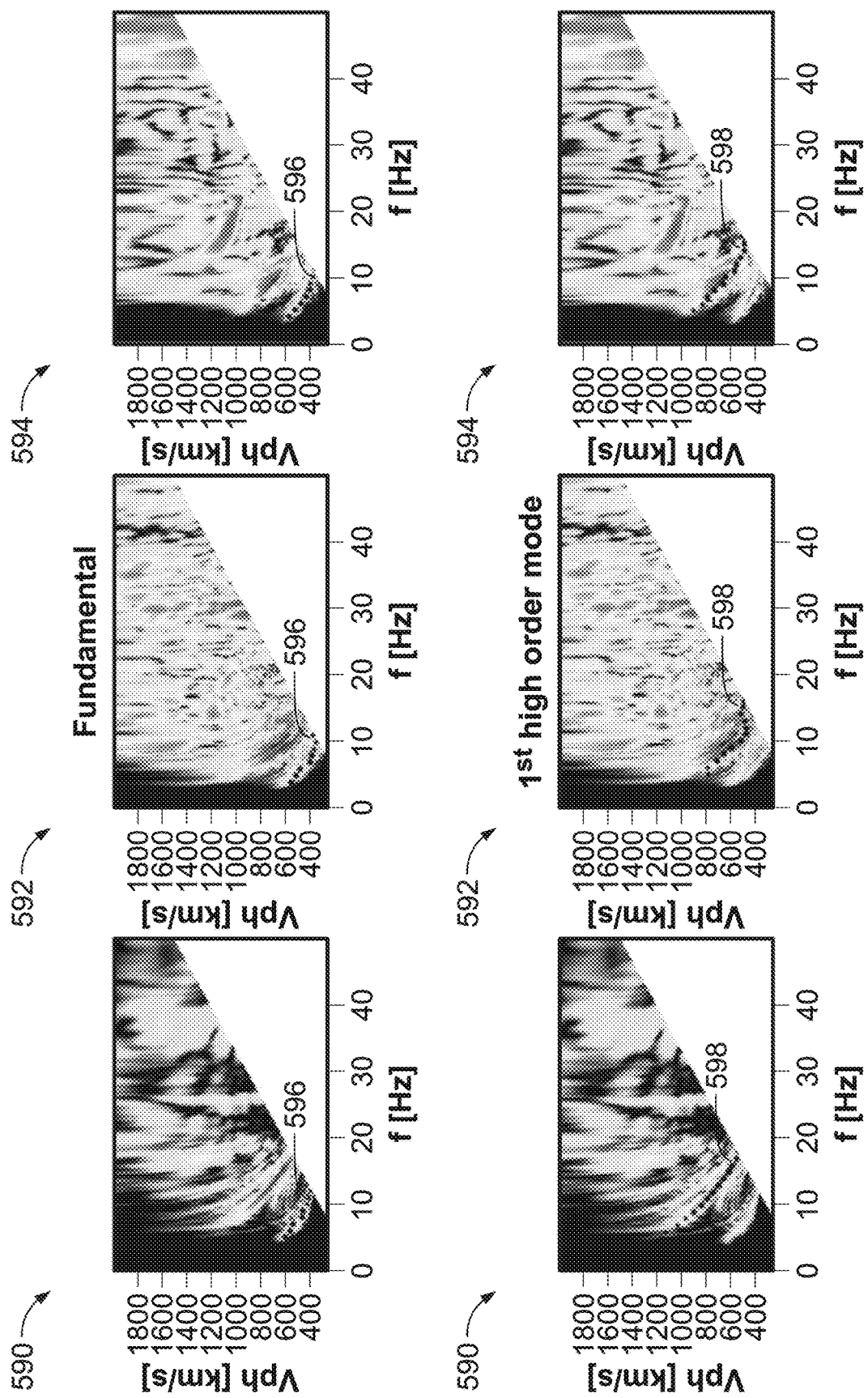
FIG. 8 shows example dispersion curves picked from a seismic dataset.

FIG. 8 shows results from an example application of the workflow 540 using the DBSCAN technique to perform a fully automatic picking of surface wave dispersion curves. The field data was measured by a high-resolution 2D seismic survey with 15 m shot spacing. The ultimate goal is to characterize the shallow near-surface (e.g., the first 100 m of subsurface) in terms of S velocities, for the total extent of the survey line, which was about 100 km. Three separate example phase velocity spectra are shown (590, 592, 594). The dispersion curves were recovered for the frequency range of about 5-20 Hz in this example. The workflow 540 was able to pick dispersion curves associated with the fundamental mode 596 and the first higher order mode 598 in each example phase velocity spectra.

After SW dispersion curves (DCs) have been picked, uncoupled pseudo 3D surface wave velocity distributions can be obtained through forward modeling of SW DCs (step 162) and the corresponding 1D inversion (step 166). The 1D SW inversion algorithm can be implemented as a minimization of an objective function $\phi_{sw}(m_s)$ consisting of a data misfit $\phi_{d,Dc}(m_s)$ and a model regularization function $\phi_{reg,s}(m_s)$:

$$\phi_{SW}(m_S) = \phi_{d,DC}(m_S) + \lambda_{reg,S}\phi_{reg,S}(m_S), \tag{3}$$

where $\lambda_{reg,s}$ is the weight of the regularization term $\phi_{reg,s}(m_s)$ over the data misfit term. The model is represented by the S velocity distribution $m_s$, expressed as the concatenation of 1D S velocity profiles $m_{s,n}$ located below each n-th VSG lateral (X,Y) position:

$$m_S = [m_{S,1}, m_{S,2}, \ldots, m_{S,N}]. \tag{4}$$

The data misfit $\phi_{d,DC}(m_s)$ is given by:

$$\phi_{d,DC}(m_S) = \frac{1}{2}\sum\nolimits_{n=1}^{N} \|W_{d,DC}(g_{obs,n} - g_{mod,n}(m_{S,n}))\|_2^2, \tag{5}$$

where $g_{obs,n}$ are the observed DC at the n-th VSG and $g_{mod,n}$ are the calculated DCs from the S velocity model profiles $m_{s,n}$. $W_{d,DC}$ is the data covariance matrix for the DCs. The forward-modeling is implemented calculating the Rayleigh-wave phase velocity from laterally constant layers of an infinite half space. The forward problem is solved by using the method of reflection and transmission coefficients. The dispersion curves associated with the fundamental and higher order modes of propagation $k_j(\omega)$ are computed by finding the solutions of the Rayleigh dispersion equation, or the Rayleigh secular function, which is known in implicit form as:

$$f_R[\lambda(z), \mu(z), \rho(z), k_j, \omega] = 0, \tag{6}$$

where $\lambda(z)$, $\mu(z)$ are the vertical distributions of the Lame parameters and $\rho(z)$ is the vertical distribution of the density of the subsurface formation.

The inversion is obtained by minimizing $\phi_{SW}(m_S)$ through an optimization algorithm such as a non-linear conjugate gradient (NLCG) algorithm among others.

Turning attention to obtaining P velocity distributions, after generating a plurality of VSGs (step 154), the transmitted wavefield travel times (e.g., first breaks-FB) can be obtained by performing statistical evaluations of the sorted (e.g., single fold) FB to obtain a mean value, or the travel times can be picked automatically from enhanced VSGs (step 156).

The corresponding P velocity can be obtained through the inversion of the transmitted energy propagating from a source by 1.5D travel time inversion of VSG travel times and by 1.5D Full Waveform Inversion (FWI) of the volumetric VSG wavefields (1.5D TT-FWI), which includes the forward modeling step (steps 160 and 164). The 1.5D TTFWI differs from the 1.5D FWI as the objective function for the inversion includes a travel time residual objective function in addition to the FWI objective function.

The VSG formation procedure (step 154), followed by a Laplace transform along the time axis, generates N gathers of observed seismic data $p_{obs,n}(z_i, r_i, s_l)$, sampled at $N_{rcv}$ depth-offset pairs $(z_i, r_i)$, and $N_{freq}$ complex frequencies $s_l = \sigma_l + j\omega_l$ that are user-specified, with $1 \le n \le N$; $1 \le i \le N_{rcv}$; $1 \le l \le N_{freq}$. The complex frequency $s_l$ is defined by two components: an angular frequency $\omega_l$ and a damping parameter $\sigma_l$.

For each VSG, a vector $p_{obs,n}$ is constructed from the samples $p_{obs,n}(z_i, r_i, s_l)$. Then, the Laplace-Fourier FWI objective function takes the following form:

$$\phi_{FWI}(m_P) = \phi_{d,FW}(m_P) + \lambda_{reg,P}\phi_{reg,P}(m_P), \tag{7}$$

where $\lambda_{reg}$ is the weight of the regularization term $\phi_{reg,P}(m_P)$ over the data misfit term $\phi_{d,FW}(m_P)$.

$\phi_{d,FW}(m_P)$ is defined as:

$$\phi_{d,FW}(m_P) = \frac{1}{2}\sum\nolimits_{n=1}^{N} \|W_{d,FW}(p_{obs,n} - p_{mod,n}(m_{P,n}))\|_2^2, \tag{8}$$

where $p_{mod,n}$ is the data calculated from the model $m_P$. The vector $m_P$ is obtained by the concatenation of the 1D P velocity profiles $m_{P,n}$ located below each n-th VSG lateral (X,Y) position:

$$m_P = [m_{P,1}, m_{P,2}, \ldots, m_{P,N}], \tag{9}$$

and $W_{d,FW}$ is the covariance matrix that takes into account the uncertainties due to both the measurements and the modeling.

Given each $p_{obs,n}$, the purpose of FWI is to recover a corresponding vector of model parameters $m_{P,n}$ that yields forward-modeled data $p_{mod,n}$ that is close, in the least-squares sense, to the observed data. The regularization functional $\phi_{reg,P}(m_P)$ can be used to enforce depth-dependent regularization and/or lateral regularization on the 3D model volume.

Producing the forward-modeled data $p_{mod,n}$ given model parameters $m_{P,n}$ is a necessary step of the inversion process. This step is implemented by a seismic forward modeling engine. An example of such a seismic modeling engine is the Hankel-transformed inhomogeneous Helmholtz equation in the Laplace domain for a medium with constant density and P velocity $V_P(z)$ that is only dependent on depth (a 1.5D medium). Further assuming that the medium is isotropic and acoustic, the following ordinary differential equation (ODE) can be solved to model acoustic pressure data:

$$\left[\frac{\partial^2}{\partial z^2} - k_r^2 - \left(\frac{s}{V_P(z)}\right)^2\right]\tilde{p}(z,k_r,s) = \tilde{f}(z,k_r,s). \quad (10)$$

Here $\tilde{p}(z,k_r,s)$ is the acoustic pressure data in the horizontal wavenumber-frequency domain, generated by a source field $\tilde{f}(z,k_r,s)$. The symbol $k_r$ denotes the horizontal wavenumber. As the observed data is usually sampled in an offset domain, a second step is used to transform the modeled wavefield from the wavenumber domain back to the offset domain. This is done by numerically applying the inverse Hankel transform, given by the integral:

$$p(z,r,s) = \int_0^\infty \tilde{p}(z,k_r,s) J_0(rk_r) k_r dk_r, \quad (11)$$

where $J_0$ is the zero-th order Bessel function of the first kind. The integral transform above maps the wavenumber-domain data $\tilde{p}(z,k_r,s)$ to the offset-dependent data $p(z,r,s)$. The vector $p_{mod,n}$ can then be constructed from the samples $\tilde{p}(z_i,r_i,s_i)$, the sampling locations matching those of the observed data.

The inversion is obtained through the minimization of the total objective function $\phi_{FW}(m_P)$ using optimization algorithms such as NLCG among others.

From the seismic data it is also possible to extract information only related to the time of the first arrivals of the seismic waveforms (TT). This information can be used to produce a P velocity distribution of the subsurface, which however typically has low resolution and cannot recover velocity inversions (low velocity layers surrounded by high velocity layers) due to the refracted energy associated with the first arrivals being confined in the high velocity layers. On the other hand, FWI can produce a high-resolution P velocity model, without suffering from the problem of the velocity inversion, but it requires a very good initial velocity model so that its objective function (typically highly multimodal) can be properly minimized with local optimization techniques. A combination of the two techniques can improve the accuracy and resolution of the final P velocity model. This can be obtained by explicitly adding to the FWI objective function an additional term, which minimizes the difference between the observed and recomputed TT in the least square sense.

The 1.5D Travel time TT-FWI objective function can be expressed as:

$$\phi_{TTFWI}(m_P) = \phi_{d,FW}(m_P) + \lambda_{TT}\phi_{d,TT}(m_P) + \lambda_{reg,P}\phi_{reg,P}(m_P). \quad (12)$$

where $\lambda_{TT}$ is a parameter which weights the contributions of the different datasets (TT and FW), where the TT data misfit $\phi_{d,TT}(m_P)$ is given by:

$$\phi_{d,TT}(m_P) = \frac{1}{2}\sum_{n=1}^{N} \|W_{d,TT}(t_{obs,n} - t_{mod,n}(m_{P,n}))\|_2^2, \quad (13)$$

where $t_{obs,n}$ are the observed TT at the n-th VSG and $t_{mod,n}$ are the TT calculated from the P velocity model profiles $m_{P,n}$. $W_{d,TT}$ is the data covariance matrix for the TT. The forward-modeling is implemented analytically calculating the first arrival times by applying Snell's law for a 1.5 medium. The inversion is obtained by minimizing $\phi_{TTFWI}(m_P)$ through an optimization algorithm such as NLCG.

In FIG. 3A, the example workflow 150 generates independent, uncoupled $V_p$ and $V_s$ pseudo 3D distributions resulting from the merging of spatially regularized 1D functions of velocity versus depth (step 168). The approach for the generation of the 3D parameter distribution is independent for each case such that the P velocity is not influenced by the S velocity derivation and vice versa. The resulting 3D parameter distributions of P and S velocities can be used to obtain equivalent $V_p/V_s$ volumes and Poisson's ratio volumes by using the following transformation equation where it is assumed the material is isotropic and homogeneous:

$$\sigma = \frac{\left(\frac{V_P}{V_S}\right)^2 - 2}{2\left(\frac{V_P}{V_S}\right)^2 - 2}. \quad (14)$$

In FIG. 3B, simultaneous or co-operative 1.5D joint inversion of travel times, full waveforms and SW dispersion curves is performed to obtain coupled 3D P and S velocity distributions, a $V_p/V_s$ distribution and a Poisson's ratio distribution in the investigated area (step 174). The joint inversion objective function accounts for regularization operators or coupling mechanisms between the P and S velocities. These involve constraints on the shape of the parameter distribution (e.g., structure coupling constraints) and on the physical relationships among P and S velocities (e.g., rock-physics coupling constraints). Optimal structure coupling constraints can be provided by gradient operators such as summative operators where the sign of the gradient polarity, rather than the simple gradient direction (e.g., cross-gradients), provides additional levels of coupling between P and S velocity structures (e.g., P and S velocity gradients are always positively correlated). Optimal rock-physics operators are provided by unsupervised clustering techniques such as Fuzzy C-mean clustering, DBSCAN or other.

The approach, generally referred to as "joint inversion", consists of a joint minimization of an objective function composed by the data residuals of two or more geophysical property domains, followed by multi-parameter coupling operators and other inversion regularization terms. A typical joint inversion framework can be described with a model space characterized by the model vector m consisting of property components from different geophysical domains. In the specific case we consider P and S velocity distributions: $m=[m_P, m_S]$. The data space is represented by d obtained from geophysical sets of measurements such as, in this invention, refracted wave travel times, full waveforms and surface wave dispersion curve phase velocity: d=[p, t, g]. A joint inversion (JI) algorithm can be formulated as a constrained least squares problem solved by minimizing a composite objective function consisting of a data misfit, a model regularization function, and inter-domain coupling operators, or penalty functions. The penalty terms are structure (e.g., gradient based) constraints, acting on the shape of the parameter distributions, and compositional constraints such as rock-physics (e.g., regression based) and unsupervised clustering, both acting on the property values:

$$\phi_{TTFWI-SW}(m,D,\hat{m}) = \phi_d(m) + \phi_{reg}(m) + \lambda_x \phi_x(m) + \lambda_{rp}\phi_{rp}(m) + \lambda_c \phi_{FCM}(m,D,\hat{m}), \quad (15)$$

where $\lambda_x$, $\lambda_{rp}$ and $\lambda_c$ are the weights of the inter-domain coupling operators in the objective function.

In this case, $\phi_d(m)$ is defined as:

$$\phi_d(m) = \phi_{d,FW}(m_P) + \lambda_{TT}\phi_{d,TT}(m_P) + \lambda_{DC}\phi_{d,DC}(m_S). \quad (16)$$

The model regularization function $\phi_m(m)$ is defined as:

$$\phi_{reg}(m) = \lambda_{reg,P}\phi_{reg,P}(m_P) + \lambda_{reg,S}\phi_{reg,S}(m_S), \quad (17)$$

The remaining misfit terms, $\phi_x(m)$, $\phi_{rp}(m)$ and $\phi_{FCM}(m,D,\hat{m})$ are the structure, rock-physics and clustering operators, respectively, which make $\phi_{TTFWI-SW}(m,D,\hat{m})$ a joint inversion objective function. The inversion is obtained by minimizing $\phi_{TTFWI-SW}(m,D,\hat{m})$ through an optimization algorithm such as NLCG among others.

Typical gradient-based structure operators for two models $(m_P, m_S)$ are based on cross-gradients:

$$x(m_P, m_S) = \nabla m_P \times \nabla m_S, \quad (18)$$

or summative gradients:

$$x(m_P, m_S) = \frac{\nabla m_P}{\sqrt{|\nabla m_P|^2 + \varepsilon^2}} + h\frac{\nabla m_S}{\sqrt{|\nabla m_S|^2 + \varepsilon^2}}, \quad (19)$$

where $h=\pm 1$ is the correlation sign, and $\varepsilon$ is a damping parameter. The difference between the structure coupling terms is that cross-gradients constrain the general direction of the gradients regardless of the respective polarity while summative gradients consider the polarity (e.g., correlated versus anticorrelated distributions) allowing stronger constraints to be injected into the solution. The P and S velocities are positively correlated such that a summative gradient operator represents an optimal choice.

The rock-physics operator $\phi_{rp}$ can be represented by a model reference term linking the current model m to an expected model $\overline{m}$ obtained from a regression of the points $$\phi_{rp}(m) = \|W_{rp}(m - \overline{m})\|^2_{L_2}, \quad (20)$$

where $W_{rp}$ is the rock-physics covariance matrix.

One problem related to standard, nonlinear, rock-physics coupling methods (such as in eq. 20) is that the rock physics relation may be variable over a certain area and the attempt to force the joint inversion results toward a fixed rock-physics relation may damage the convergence and the results of the joint inversion.

A different approach to rock-physics coupling is to consider unsupervised machine learning clustering methods such as fuzzy C-means (FCM) as the rock-physics constraint. In this approach, the clustering associations and the center of the clusters are re evaluated at each inversion iteration based on the inversion results. The fuzzy C-means clustering approach allows variable clusters to be present in the inversion framework for the association of P and S velocities as driven by the data misfit minimization.

The optimization of $\phi_{FCM}(m,D,\hat{m})$ is performed in two steps (i.e., with alternated minimization steps). The first step consists of the optimization of the cluster memberships D and of the cluster centers $\hat{m}$. The second step uses the updated clusters to update the model m in the total objective function (equation 15).

For the first step (cluster optimization for D, $\hat{m}$), consider the point $m_a$, with coordinate $(m_{P_a}, m_{S_a})$, and point $\hat{m}_b$ with coordinate $(\hat{m}_{P_b}, \hat{m}_{S_b})$, where $m_{P_a}$ and $m_{S_a}$ are the $a^{th}$ cell of the P and S velocity models, $\hat{m}_{P_b}$ and $\hat{m}_{S_b}$ are the $b^{th}$ cluster center of the P and S velocity model distributions.

Figure 9:
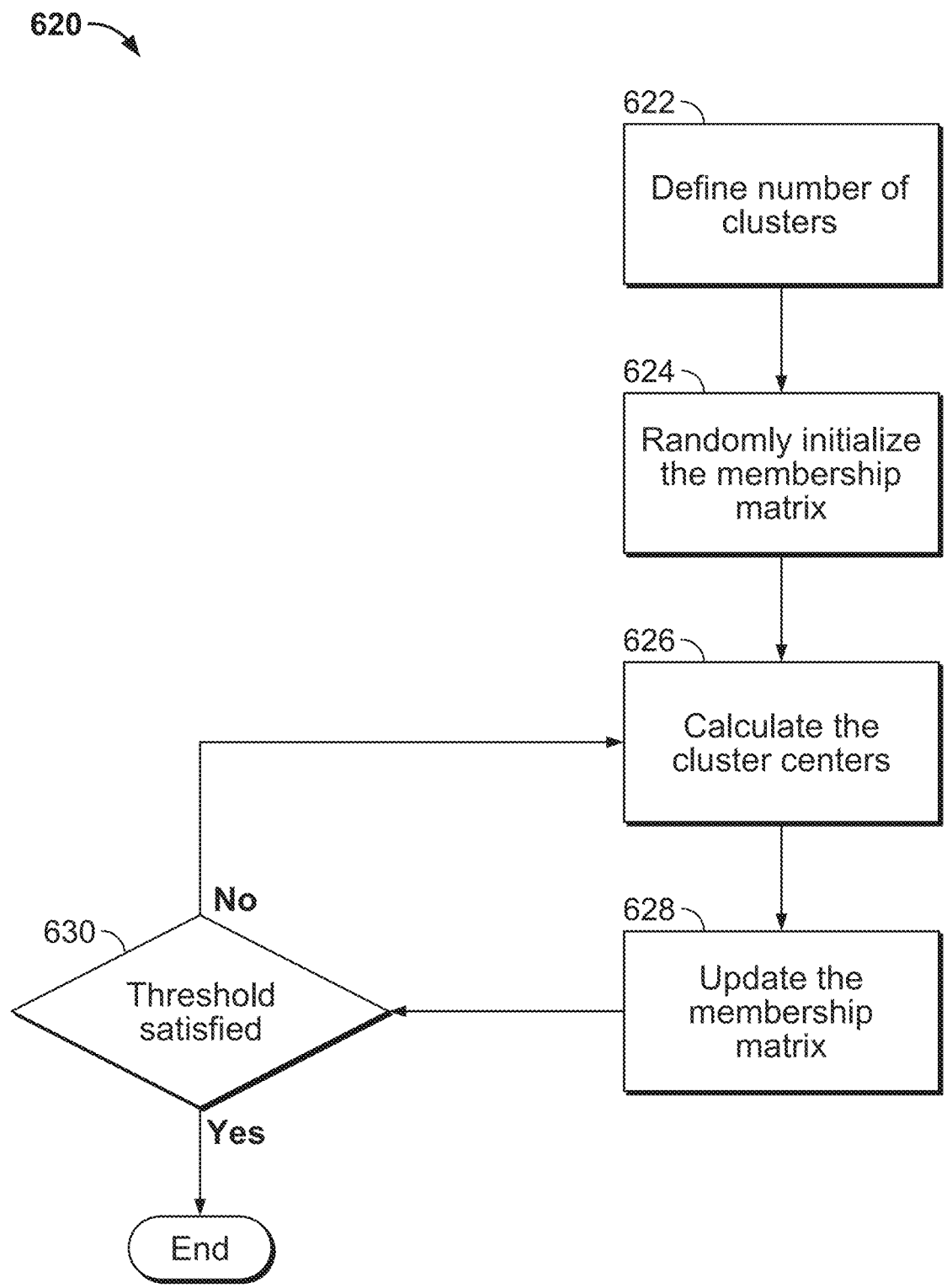
FIG. 9 shows a flow diagram of an example implementation of a Fuzzy C-means clustering technique.

FIG. 9 is an example method 620 of applying the FCM technique. During clustering, FCM performs the following operations, such that $D_{ab}$ is required to be nonnegative and fill the following relation:

$$\sum_{b=1}^{C} D_{ab} = 1. \quad (21)$$

The number of clusters is defined (step 622). The cluster membership values are randomly initialized (step 624) and then the cluster centers are calculated (step 626):

$$\hat{m}_b = \frac{\sum_{a=1}^{Nm} D_{ab}^q m_a}{\sum_{a=1}^{Nm} D_{ab}^q}. \quad (22)$$

Then, the membership is updated using the following (step 628):

$$D_{ab} = \frac{\|m_a - \hat{m}_b\|^{\frac{-2}{q-1}}}{\sum_{c=1}^{C}\|m_a - \hat{m}_c\|^{\frac{-2}{q-1}}}. \quad (23)$$

These operations are repeated until a convergence threshold is reached (step 630). This process corresponds to the standard FCM optimization algorithm and can be described as an inner optimization step of the total objective function in equation 15. The FCM algorithm allows each point $m_a$ corresponding to the $a^{th}$ cell to belong to multiple clusters, with varying degrees of membership, D.

For the second step the current model is minimized relative to the FCM clustering results:

$$\phi_{FCM}(m, D, \hat{m}) = \sum_{a=1}^{Nm} \sum_{b=1}^{C} D_{ab}^q \|m_a - \hat{m}_b\|_2^2, \quad (24)$$

where C is the number of clusters, $N_m$ is the number of model cells and $q \geq 1$ is an exponent controlling the degree of fuzzy overlapping. The cluster memberships D and the cluster centers m are obtained from the first step and are kept fixed during the minimization of equation 24 that occurs simultaneously with the minimization of equation 15. The iterative procedure of updating membership values and cluster centers continues in each inversion step.

Figure 10:
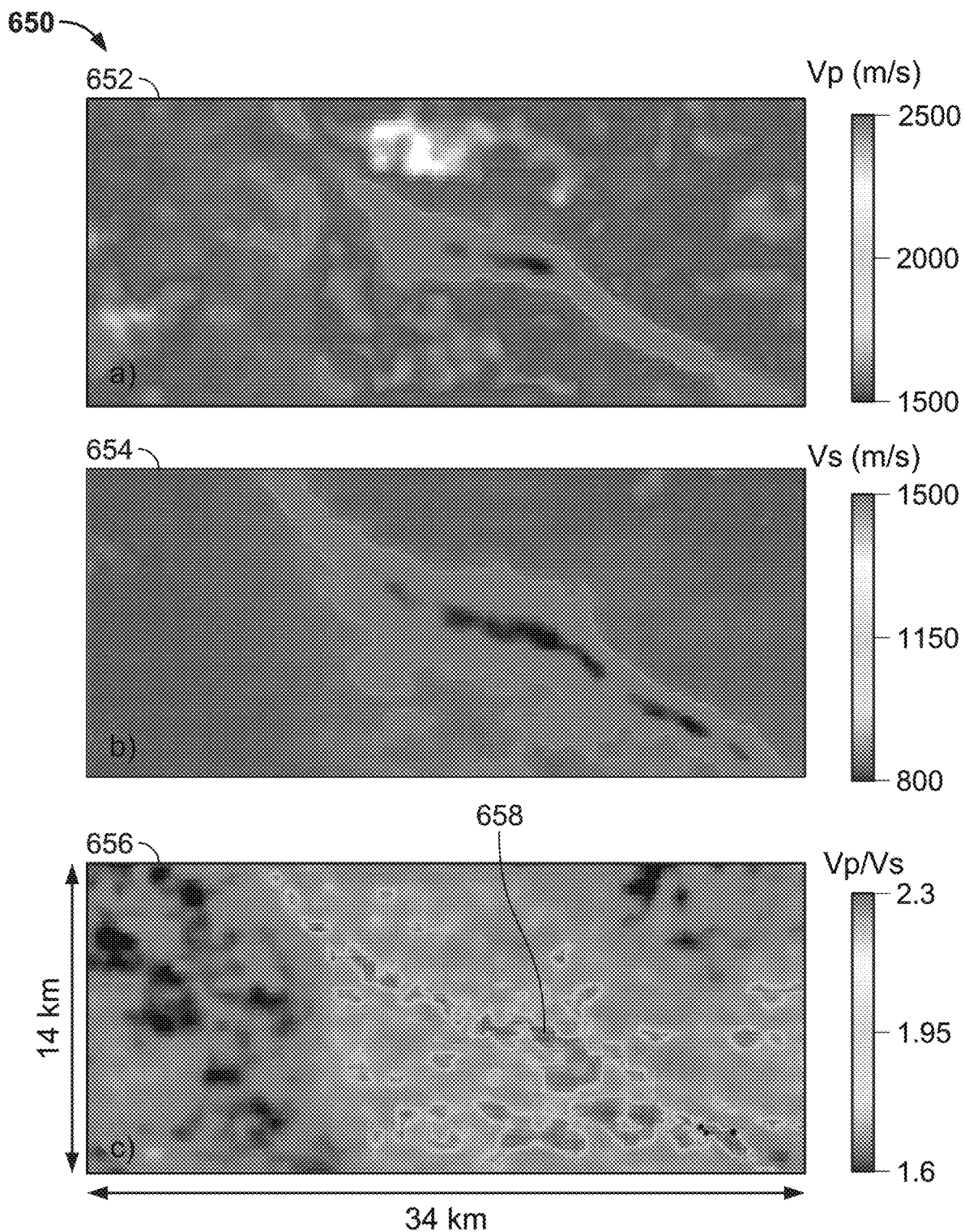
FIG. 10 shows an example of coupled $V_p$, $V_s$ and $V_p/V_s$ derived from an implementation of the method of this disclosure.

FIG. 10 shows joint inversion results 650 as applied to an arid region with a distinctive wadi feature (e.g., drainage channel, valley) in the center of the 3D seismic block. The solution of the joint inversion problem provides coupled 3D parameter distributions of P velocity, S velocity, $V_p/V_s$ and Poisson's ratio to provide robust near surface property estimations. This example implementation of the method 170 provides coupled 3D distributions of P velocity 652 and S velocity 654, as well as the $V_p/V_s$ parameter 656 from which the Poisson's ratio can be readily obtained using equation 14. The wadi area 658 shows higher $V_p/V_s$ values due to the presence of water or moisturized sediments. The surrounding areas are desert and show lower $V_p/V_s$ values characteristic of dry sediments.

Figure 11:
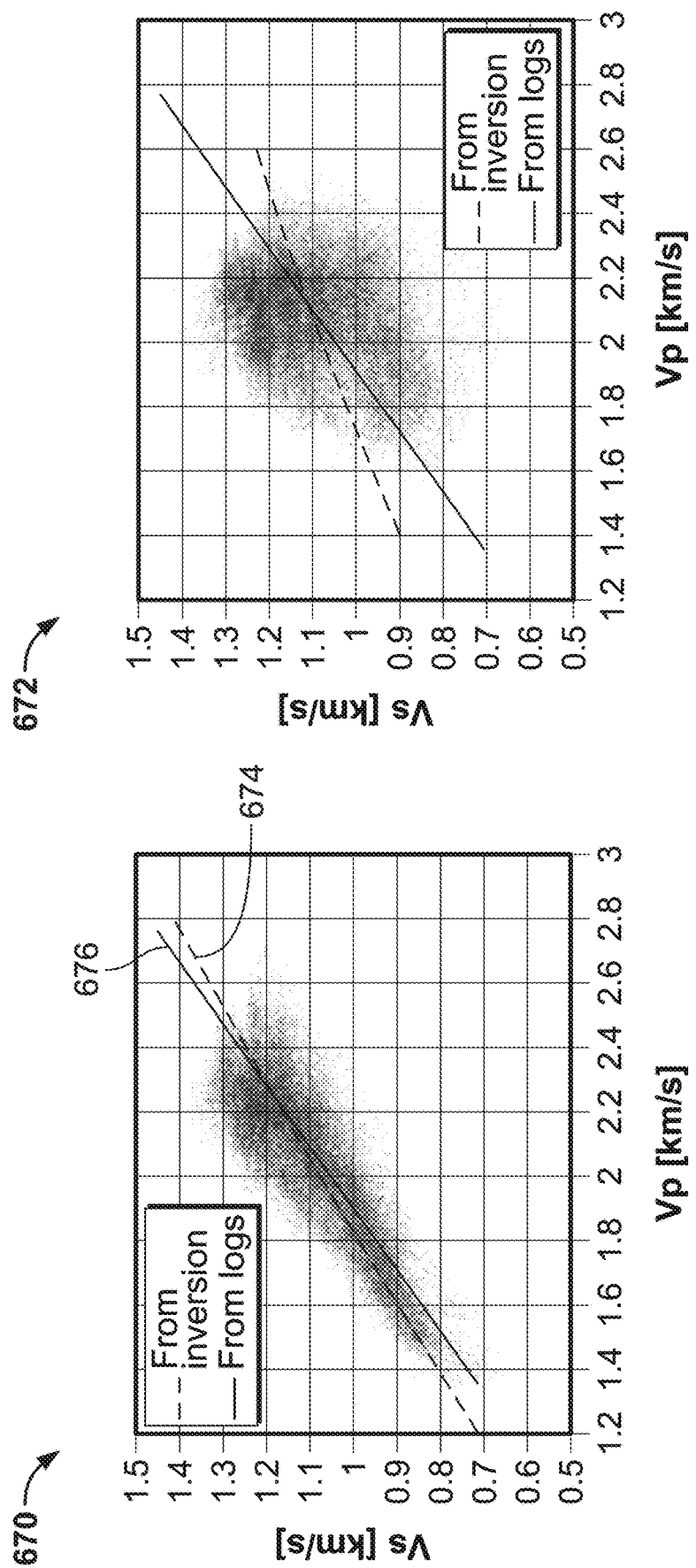
FIG. 11 shows example cross plots of $V_s$ and $V_p$ obtained from joint inversion and uncoupled inversion.

FIG. 11 shows cross plots of $V_p$ and $V_s$ for the example implementations of the method 150 and the method 170 where a linear regression is calculated from the distribution of points in the cross plot. The obtained $V_p$ and $V_s$ values obtained from the coupled joint inversion process 670 are compared to the corresponding values obtained with the independent, uncoupled approach 672. The linear regression (function of $V_p/V_s$) is compared to the result of a nearby well where P and S velocity logs are present. The cross plot from the joint inversion process 670 is better behaved than the cross plot from uncoupled inversions 672, and the resulting regression from the joint inversion process 674 is closer to the values obtained from well logs 676.

Figure 12:
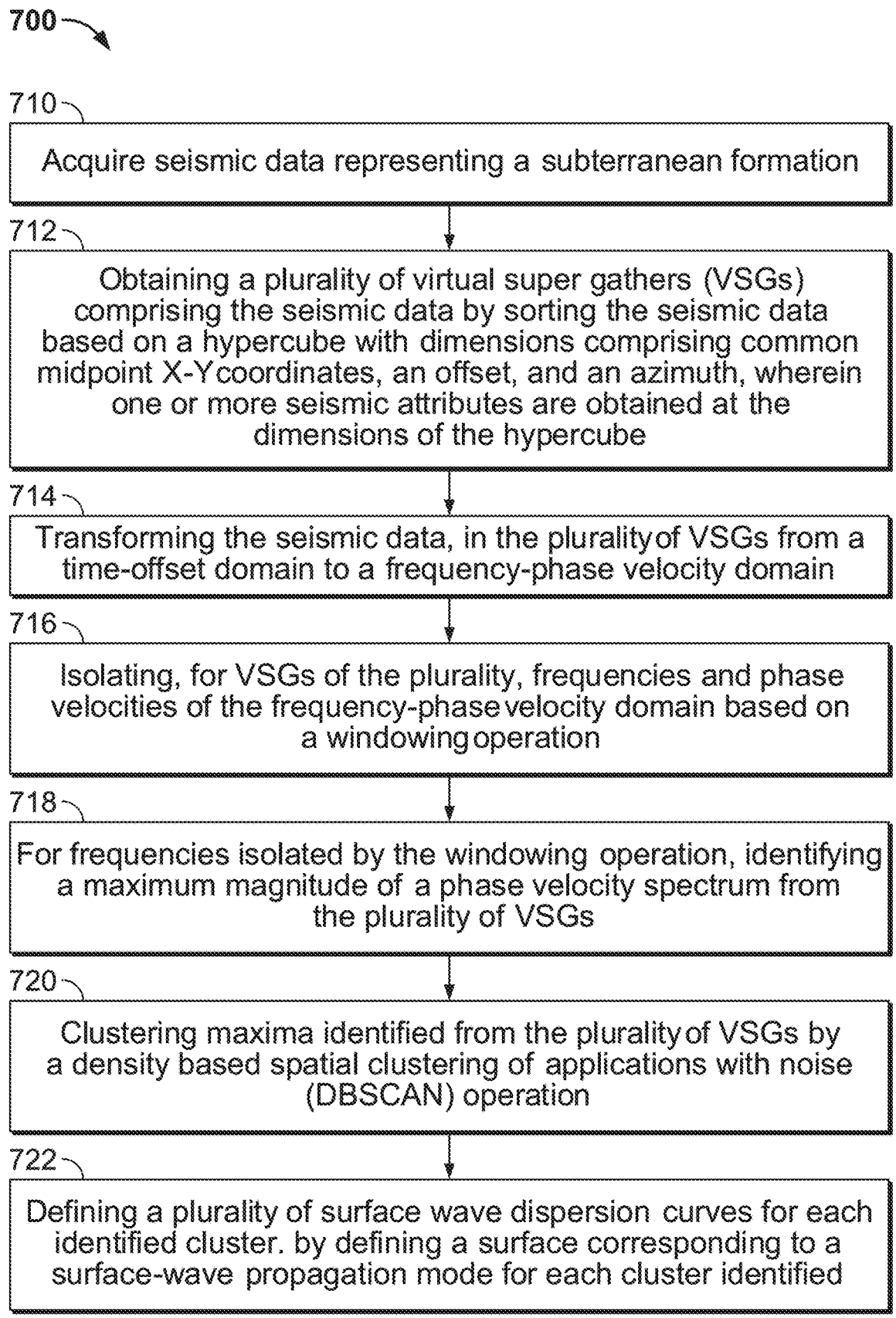
FIG. 12 shows an example flow chart of a method for obtaining SW dispersion curves.

FIG. 12 shows an example flow chart for a method of obtaining dispersion curves 700 for geophysical exploration. The method 700 comprises acquiring seismic data representing a subterranean formation (step 710). Obtaining a plurality of virtual super gathers (VSGs) comprising the seismic data by sorting the seismic data based on a hypercube with dimensions comprising common midpoint X-Y coordinates, an offset, and an azimuth, wherein one or more seismic attributes are obtained at the dimensions of the hypercube (step 712). Transforming the seismic data, in the plurality of VSGs from a time-offset domain to a frequency-phase velocity domain (step 714). Isolating, for VSGs of the plurality, frequencies and phase velocities of the frequency-phase velocity domain based on a windowing operation (step 716). For frequencies isolated by the windowing operation, identifying a maximum magnitude of a phase velocity spectrum from the plurality of VSGs (step 718). Clustering maxima identified from the plurality of VSGs by a density based spatial clustering of applications with noise (DBSCAN) operation (step 720). Defining a plurality of surface wave dispersion curves for each identified cluster, by defining a surface corresponding to a surface-wave propagation mode for each cluster identified (step 722).

Figure 13:
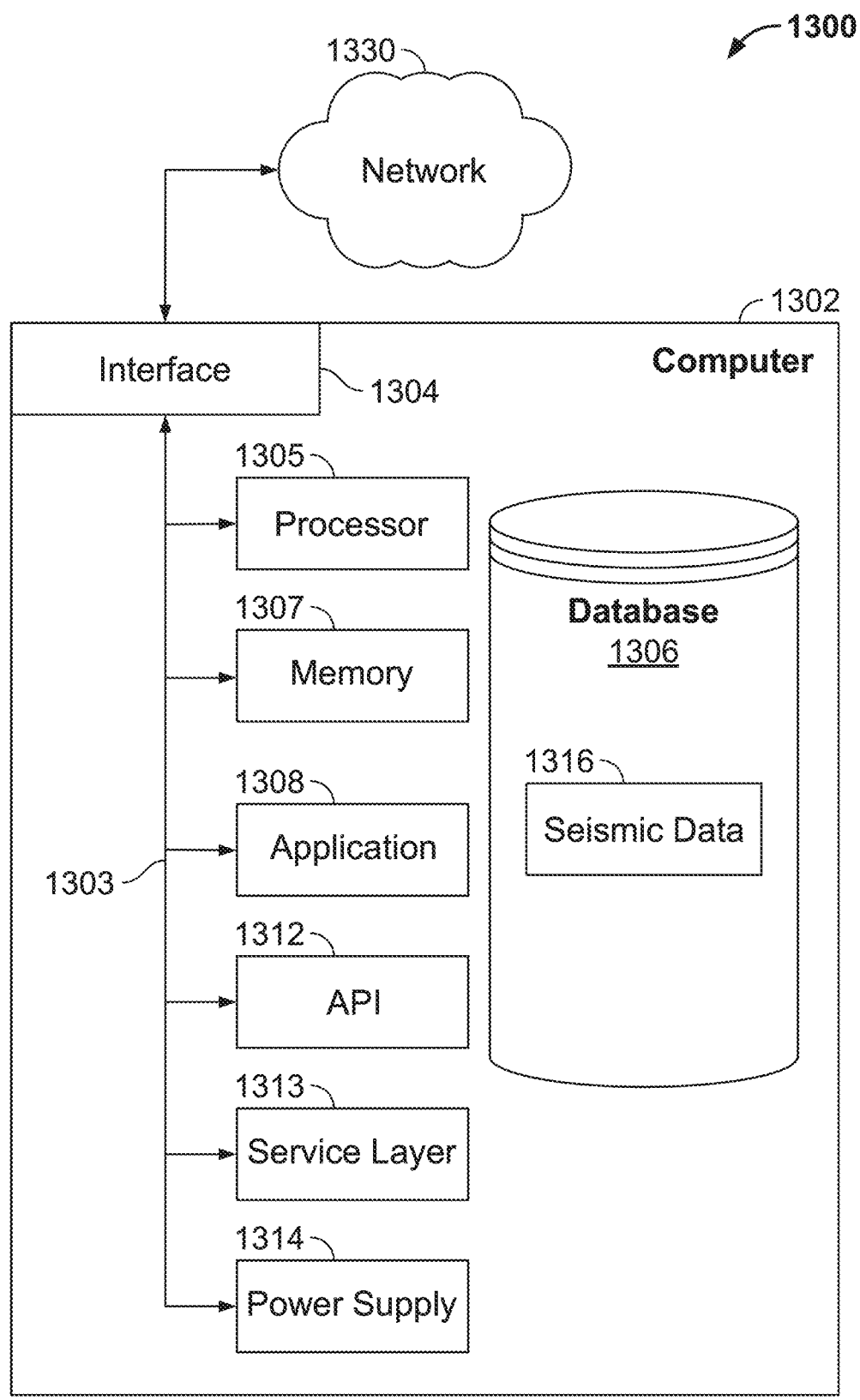
FIG. 13 is a diagram of an example computing system.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the invention have been described. Nevertheless, it will be understood that various modifications may be made without departing from the spirit and scope of the invention. In some instances, some processes recited may not be required to achieve desirable results. For example, low pass filtering or outlier rejection may not be required to obtain SW dispersion curves. Accordingly, other embodiments are within the scope of the following claims.

What is claimed is:

1. A method for geophysical exploration, the method comprising:
   acquiring seismic data representing a subterranean formation;
   obtaining a plurality of virtual super gathers (VSGs) comprising the seismic data by sorting the seismic data based on a hypercube with dimensions comprising common midpoint X-Y coordinates, an offset, and an azimuth, wherein one or more seismic attributes are obtained at the dimensions of the hypercube;
   transforming the seismic data, in the plurality of VSGs from a time-offset domain to a frequency-phase velocity domain;
   isolating, for VSGs of the plurality, frequencies and phase velocities of the frequency-phase velocity domain based on a windowing operation;
   for frequencies isolated by the windowing operation, identifying a maximum magnitude of a phase velocity spectrum from the plurality of VSGs;
   generating a three-dimensional (3D) map of near surface properties of the subterranean formation using the identified maximum magnitude of the phase velocity spectrum; and
   identifying drilling hazards in the subterranean formation based on the 3D map of near surface properties.

2. The method of claim 1 further comprising:
   clustering maxima identified from the plurality of VSGs by a density based spatial clustering of applications with noise (DBSCAN) operation.

3. The method of claim 2 further comprising:
   defining a plurality of surface wave dispersion curves for each identified cluster, by defining a surface corresponding to a surface-wave propagation mode for each cluster identified.

4. The method of claim 3, further comprising iteratively performing the clustering of the maxima and the defining of the plurality of surface wave dispersion curves.

5. The method of claim 3, further comprising:
   obtaining a pseudo three-dimensional (3D) surface wave velocity distribution by:
   forward modeling the plurality of surface wave dispersion curves; and
   inverting the plurality of forward modeled surface wave dispersion curves.

6. The method of claim 5, further comprising:
obtaining a 3D P velocity distribution based on automatically picking a transmitted wavefield first break travel time for the VSGs of the plurality;
generating a forward modeled one and a half dimension (1.5D) travel time full waveform for VSGs of the plurality; and
inverting the forward modeled 1.5D travel time full waveform for the VSGs of the plurality.

7. The method of claim 6, further comprising:
computing a 3D distribution of Poisson's ratio of the subterranean formation based on the 3D P velocity distribution and the pseudo 3D surface wave velocity distribution.

8. The method of claim 3, further comprising:
forward modeling the plurality of surface wave dispersion curves;
picking a transmitted wavefield first break travel time for the VSGs of the plurality;
generating a forward modeled 1.5D travel time full waveform for the VSGs of the plurality; and
performing a joint 1.5D travel-time full waveform surface wave inversion comprising a structure operator, a rock-physics operator, and a clustering operator to obtain a pseudo 3D S velocity distribution and a 3D P velocity distribution.

9. The method of claim 8, further comprising, computing a 3D distribution of Poisson's ratio of the subterranean formation using the 3D P velocity distribution and the pseudo 3D surface wave velocity distribution.

10. The method of claim 1, further comprising, drilling a well in the subterranean formation based on the 3D map of near surface properties.

11. A method for geophysical exploration, the method comprising:
acquiring seismic data representing a subterranean formation;
obtaining a plurality of virtual super gathers (VSGs) comprising the seismic data by sorting the seismic data based on a hypercube with dimensions comprising common midpoint X-Y coordinates, an offset, and an azimuth, wherein one or more seismic attributes are obtained at the dimensions of the hypercube;
transforming the seismic data, in the plurality of VSGs from a time-offset domain to a frequency-phase velocity domain;
isolating, for VSGs of the plurality, frequencies and phase velocities of the frequency-phase velocity domain based on a windowing operation;
for frequencies isolated by the windowing operation, identifying a maximum magnitude of a phase velocity spectrum from the plurality of VSGs; and
drilling a well in the subterranean formation based on a 3D distribution of Poisson's ratio determined based on the plurality of VSGs.

12. One or more non-transitory machine-readable storage devices storing instructions for geophysical exploration, the instructions being executable by one or more processing devices to cause performance of operations comprising:
obtaining a plurality of virtual super gathers (VSGs) comprising seismic data by sorting the seismic data based on a hypercube with dimensions comprising common midpoint X-Y coordinates, an offset, and an azimuth, wherein one or more seismic attributes are obtained at the dimensions of the hypercube;
transforming the seismic data, in the plurality of VSGs from a time-offset domain to a frequency-phase velocity domain;
isolating, for VSGs of the plurality, frequencies and phase velocities of the frequency-phase velocity domain based on a windowing operation;
for frequencies isolated by the windowing operation, identifying a maximum magnitude of a phase velocity spectrum from the plurality of VSGs;
generating a three-dimensional (3D) map of near surface properties of the subterranean formation using the identified maximum magnitude of the phase velocity spectrum; and
identifying drilling hazards in the subterranean formation based on the 3D map of near surface properties.

13. The one or more machine-readable storage devices of claim 12, wherein the operations further comprise:
clustering maxima identified from the plurality of VSGs by a density based spatial clustering of applications with noise (DBSCAN) operation.

14. The one or more machine-readable storage devices of claim 13, wherein the operations further comprise:
defining a plurality of surface wave dispersion curves for each identified cluster, by defining a surface corresponding to a surface-wave propagation mode for each cluster identified.

15. The one or more machine-readable storage devices of claim 14, wherein the operations further comprise:
iteratively performing clustering the maxima and the defining a plurality of surface wave dispersion curves.

16. The one or more machine-readable storage devices of claim 14, wherein the operations further comprise:
obtaining a pseudo 3D surface wave velocity distribution by forward modeling the plurality of surface wave dispersion curves; and
inverting the plurality of forward modeled surface wave dispersion curves.

17. The one or more machine-readable storage devices of claim 16, wherein the operations further comprise:
obtaining a 3D P velocity distribution through automatically picking a transmitted wavefield first break travel time for VSGs of the plurality;
generating a forward modeled 1.5D travel time full waveform for VSGs of the plurality; and
inverting the forward modeled 1.5D travel time full waveform for VSGs of the plurality.

18. The one or more machine-readable storage devices of claim 17, wherein the operations further comprise:
computing a 3D distribution of Poisson's ratio of the subterranean formation using the 3D P velocity distribution and the pseudo 3D surface wave velocity distribution.

19. The one or more machine-readable storage devices of claim 14, wherein the operations further comprise:
forward modeling the plurality of surface wave dispersion curves;
automatically picking a transmitted wavefield first break travel time VSGs of the plurality;
generating a forward modeled 1.5D travel time full waveform for VSGs of the plurality; and
performing a joint 1.5D travel-time full waveform surface wave inversion to obtain a pseudo 3D S velocity distribution and a 3D P velocity distribution.

20. The one or more machine-readable storage devices of claim 19, wherein the operations further comprise:

computing a 3D distribution of Poisson's ratio of the subterranean formation using the 3D P velocity distribution and the pseudo 3D surface wave velocity distribution.

\* \* \* \* \*